US009501508B2

(12) United States Patent
Monteith et al.

(10) Patent No.: US 9,501,508 B2
(45) Date of Patent: Nov. 22, 2016

(54) METHOD AND SYSTEM FOR MANAGING THE LIFETIME OF SEMANTICALLY-IDENTIFIED DATA

(75) Inventors: Michael Lorne Monteith, Toronto (CA); Stephen Paul Owens, Toronto (CA)

(73) Assignee: THOUGHTWIRE HOLDINGS CORP., Toronto, ON (CA)

( * ) Notice: Subject to any disclaimer, the term of this patent is extended or adjusted under 35 U.S.C. 154(b) by 0 days.

(21) Appl. No.: 13/578,552

(22) PCT Filed: Feb. 22, 2011

(86) PCT No.: PCT/CA2011/050109
§ 371 (c)(1),
(2), (4) Date: Aug. 10, 2012

(87) PCT Pub. No.: WO2011/100849
PCT Pub. Date: Aug. 25, 2011

(65) Prior Publication Data
US 2012/0310900 A1 Dec. 6, 2012

(51) Int. Cl.
*G06F 17/30* (2006.01)
(52) U.S. Cl.
CPC ... *G06F 17/30327* (2013.01); *G06F 17/30085* (2013.01); *G06F 17/30581* (2013.01)
(58) Field of Classification Search
CPC ............. G06F 17/30085; G06F 17/30581
USPC .................................................. 707/689
See application file for complete search history.

(56) References Cited

U.S. PATENT DOCUMENTS

| 5,301,317 | A  | * | 4/1994  | Lohman ............ G06F 17/30463 |
| 6,154,213 | A  | * | 11/2000 | Rennison .......... G06F 17/30716 345/428 |
| 6,292,804 | B1 |   | 9/2001  | Ardoin et al. |
| 6,463,404 | B1 | * | 10/2002 | Appleby ............. G06F 17/2785 704/2 |
| 7,072,800 | B1 | * | 7/2006  | Fernandez .......... G06F 11/3414 702/186 |
| 7,526,481 | B1 |   | 4/2009  | Cusson et al. |
| 7,853,618 | B2 |   | 12/2010 | Yuan et al. |
| 7,971,179 | B2 | * | 6/2011  | Venolia ......................... 717/101 |
| 8,050,983 | B1 | * | 11/2011 | Eakin ...................... G06Q 10/10 235/379 |
| 8,301,660 | B2 |   | 10/2012 | Yalamanchi |
| 2001/0047254 | A1 | * | 11/2001 | Rising, III ........ G06F 17/30017 704/9 |
| 2002/0069218 | A1 | * | 6/2002  | Sull ................... G06F 17/30796 715/202 |
| 2003/0074352 | A1 | * | 4/2003  | Raboczi ............ G06F 17/30545 |

(Continued)

FOREIGN PATENT DOCUMENTS

EP    2650832 A1    10/2013

OTHER PUBLICATIONS

International Search Report and Written Opinion for for International Application No. PCT/CA2011/050020, dated Apr. 18, 2011.

(Continued)

*Primary Examiner* — Mark E Hershley
(74) *Attorney, Agent, or Firm* — Kagan Binder, PLLC

(57) ABSTRACT

A method and system for managing the lifetime of semantically-identified data is provided. A graph data structure is maintained in storage of a computing device. The graph data structure has data items and relationships therebetween that are semantically identified. Lifetime information is stored in the storage. The lifetime information describes the period during which at least one of the data items in the graph data structure is valid.

20 Claims, 13 Drawing Sheets

(56) References Cited

U.S. PATENT DOCUMENTS

| | | |
|---|---|---|
| 2003/0105746 A1 | 6/2003 | Stickler |
| 2003/0187855 A1* | 10/2003 | Fachat ............... G06Q 30/0603 |
| 2004/0015426 A1* | 1/2004 | Tadayon et al. ................ 705/35 |
| 2004/0044866 A1 | 3/2004 | Casazza |
| 2004/0148333 A1 | 7/2004 | Manion et al. |
| 2004/0220893 A1* | 11/2004 | Spivack ............... G06F 9/4443 706/46 |
| 2004/0221053 A1 | 11/2004 | Codella et al. |
| 2004/0243531 A1 | 12/2004 | Dean |
| 2005/0021523 A1 | 1/2005 | Farag |
| 2005/0027871 A1* | 2/2005 | Bradley ............. G06Q 20/1235 709/227 |
| 2005/0044063 A1 | 2/2005 | Barsness et al. |
| 2005/0060342 A1 | 3/2005 | Farag |
| 2005/0066118 A1 | 3/2005 | Perry et al. |
| 2006/0117073 A1* | 6/2006 | Bosworth et al. ............ 707/201 |
| 2006/0190455 A1 | 8/2006 | Braddy et al. |
| 2006/0248093 A1* | 11/2006 | Lassila ............... G06F 17/30864 |
| 2007/0011649 A1* | 1/2007 | Venolia .................... G06F 8/20 717/101 |
| 2007/0011659 A1* | 1/2007 | Venolia ............. G06F 17/30958 717/127 |
| 2007/0022107 A1 | 1/2007 | Yuan et al. |
| 2007/0124291 A1 | 5/2007 | Hassan et al. |
| 2007/0213985 A1* | 9/2007 | Corwin ................... G10L 15/22 704/257 |
| 2007/0277148 A1* | 11/2007 | Venolia ........................ 717/101 |
| 2007/0280439 A1* | 12/2007 | Prywes ................. H04M 11/10 379/88.18 |
| 2008/0040308 A1 | 2/2008 | Ranganathan et al. |
| 2008/0082612 A1 | 4/2008 | Declerck |
| 2008/0198871 A1 | 8/2008 | Shahidi et al. |
| 2008/0208676 A1* | 8/2008 | Williams et al. ............... 705/10 |
| 2008/0215580 A1 | 9/2008 | Altinel et al. |
| 2008/0256166 A1* | 10/2008 | Branson .............. H04L 12/4633 709/201 |
| 2008/0256253 A1 | 10/2008 | Branson et al. |
| 2008/0313296 A1* | 12/2008 | Muller .......................... 709/206 |
| 2008/0320417 A1* | 12/2008 | Begley et al. ................ 715/822 |
| 2009/0006627 A1 | 1/2009 | Castellucci et al. |
| 2009/0150431 A1* | 6/2009 | Schmidt ............ G06F 17/30595 |
| 2009/0216714 A1 | 8/2009 | Gonzalez et al. |
| 2010/0023482 A1* | 1/2010 | Mershon ........... G06F 17/30855 707/E17.014 |
| 2011/0040846 A1 | 2/2011 | Weinryb et al. |
| 2011/0131119 A1 | 6/2011 | Ernst |
| 2011/0209138 A1 | 8/2011 | Monteith et al. |
| 2011/0314388 A1 | 12/2011 | Wheatley |

OTHER PUBLICATIONS

Office Action for U.S. Appl. No. 12/710,099, dated Jan. 5, 2015.
Office Action for U.S. Appl. No. 12/710,099, dated Aug. 26, 2013.
Search Report for UK Patent Application No. GB1404638.7, dated Sep. 22, 2014.
Search Report for UK Patent Application No. GB1404645.2, dated Sep. 26, 2014.
Office Action for U.S. Appl. No. 13/804,168, dated Feb. 2, 2015.
Google, "Gadget-to-Gadget Communication (Deprecated)", http://code.google.com/apis/gadgets/docs/pubsub.html, captured from the Internet on Apr. 1, 2010, copyright 2008.
Expressor Software, "expressor data integration products", http://www.expressor-software.com/products-overview.htm, captured from the Internet on Feb. 12, 2010.
Search Report for corresponding EP Patent Application No. 14275068.6, dated Apr. 1, 2015.

* cited by examiner

METHOD AND SYSTEM FOR MANAGING THE LIFETIME OF SEMANTICALLY-IDENTIFIED DATA

FIELD OF THE INVENTION

The present invention relates generally to information systems. In particular, the invention relates to a method and system for managing the lifetime of semantically-identified data.

BACKGROUND OF THE INVENTION

Real world information often has a finite lifetime that describes how long it can be relied on; that is, how long it is valid. Examples include an airline ticket price, the availability of a seat at a concert or the current blood pressure reading from a blood pressure monitor. The lifetime of each of these values would be quite different, ranging from very brief to quite long lived, but in each case, after some duration, the information should no longer be relied on. This lifetime can be described as the amount of time the information is "live" which can be shortened to "time to live" ("TTL").

Information lifetime is complicated for software systems to represent and act on consistently. Such software systems frequently rely on human domain knowledge to understand the lifetime and interpret the information properly. In the case of short-lived information, like ticket availability, software systems frequently use error feedback to indicate that a ticket is no longer available.

As an example imagine a person trying to book an airline flight. They search the airline system and find a flight at a price they like. They then consult about the details and get interrupted by a phone call. When they return to their computer to complete the booking, the checkout process will often fail with a message that the booking must be restarted because the selected rate is no longer available. This interaction was probably handled entirely within a single software system.

Managing information lifetime is even more complicated when the information is shared between software systems. First the software system that is the source of the information has to share lifetime information at an agreed on granularity for each item of shared information. Often, the granularity of the information being shared does not match the granularity of the lifetime information held in the host software system, further complicating the task. Next, the software system that is receiving the shared information has to understand the lifetime information. Usually this depends on a convention or standard established between the two software systems. Finally the receiving software system has to enforce the lifetime and take action when it expires, possibly by informing the user and then requesting a new copy of the information.

It is therefore an object of the invention to provide a novel method and system for managing the lifetime of semantically-identified data.

SUMMARY OF THE INVENTION

In accordance with an aspect of the invention, there is provided a method for managing the lifetime of semantically-identified data, comprising:

maintaining a graph data structure in storage of a computing device, said graph data structure having data items and relationships therebetween that are semantically identified; and storing lifetime information in said storage, said lifetime information describing the period during which at least one of said data items in said graph data structure is valid.

The lifetime information can be stored in said graph data structure.

The method can include receiving the lifetime information with a definition for the graph data structure. The lifetime information received with the definition can specify a time-to-live for a data item type. The method can further include receiving the lifetime information with the data items shared by a software system. The lifetime information received with the data items can override the lifetime information received with the definition.

The method can include receiving the lifetime information with the data items when shared by a software system.

The method can include:

monitoring said lifetime information for said data items; and updating shared values when said lifetime information indicates that said data items have expired.

The method can include notifying a software system of changes to data item values as a result of said data items having expired.

According to another aspect of the invention, there is provided a system for managing the lifetime of semantically-identified data, comprising:

a computing device having a storage;

a graph data structure stored in said storage of said computing device, said graph data structure having data items and relationships therebetween that are semantically identified; and lifetime information stored in said storage, said lifetime information describing the period during which at least one of said data items in said graph data structure is valid.

The lifetime information can be stored in the storage.

The system can include a graph data structure definition stored in the storage, the graph data structure definition including the lifetime information. The lifetime information in the graph data structure definition can define the time-to-live for at least one of the data item types defined in the graph data structure.

The method can include:

receiving a data item of said data item type; and enforcing said lifetime information for said data item.

The method can include storing the lifetime information and the data item in a graph data structure in the storage. The enforcing can include notifying a software system consuming the data item when the data item has expired according to the lifetime information.

The method can include:

receiving a data item of one of said at least one of said data item types;

receiving lifetime information with said data item; and expiring said data items according to said lifetime information received with said data item.

BRIEF DESCRIPTION OF THE DRAWINGS

Embodiments will now be described, by way of example only, with reference to the attached Figures, wherein.

DETAILED DESCRIPTION OF THE EMBODIMENTS

The present invention enables the lifetime information for semantically-identified data to be stored with the data and/or data definitions. By storing the lifetime information with the data and/or data definitions, the lifetime of such data can be handled consistently across software systems. Such a configuration permits the management of the semantically-identified data to be stored and managed by one system, thereby requiring less sophistication of other software systems as they do not have to understand and enforce the lifetime information. In addition, by storing the lifetime information with the semantically-identified data, the lifetime information is made more discoverable and maintainable, and less coding of lifetime logic is required within the software systems. Further, inter-system dependencies are reduced as the software system sharing the data items communicates lifetime information to an administrator of the data and not to the software system that ultimately consumes the information. This also enables better audit control.

Figure 1:
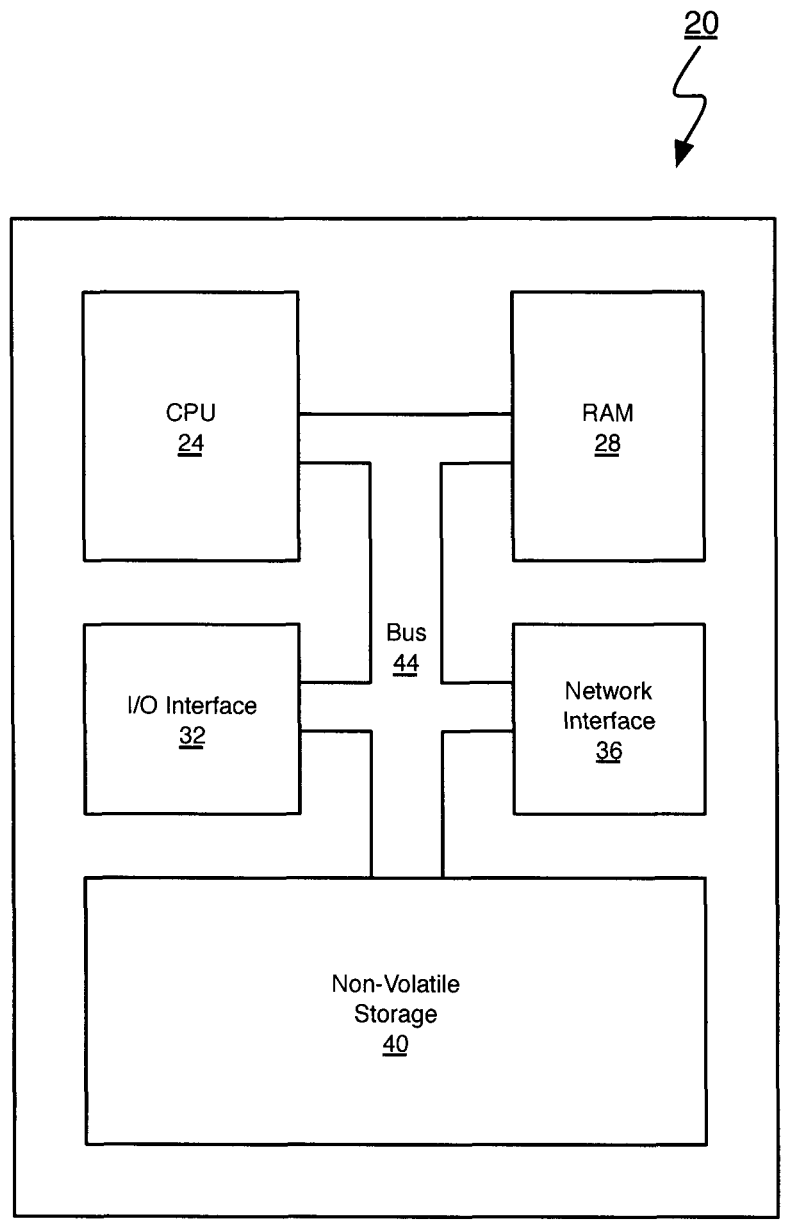
FIG. 1 shows a high-level architecture of a computer system for sharing data in accordance with an embodiment of the invention.

FIG. 1 is a high-level architectural diagram of a computer system 20 for sharing data, in accordance with an embodiment of the invention. As shown, the computer system 20 has a number of physical and logical components, including a central processing unit ("CPU") 24, random access memory ("RAM") 28, an input/output ("I/O") interface 32, a network interface 36, non-volatile storage 40, and a local bus 44 enabling the CPU 24 to communicate with the other components. The CPU 24 executes an operating system, a stateful data sharing service and a number of software systems. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other systems. Non-volatile storage 40 stores the operating system and programs, including computer-executable instructions for implementing the stateful data sharing service, and the stateful data sharing service's data. During operation of the computer system 20, the operating system, the programs and the data may be retrieved from the non-volatile storage 40 and placed in RAM 28 to facilitate execution.

Figure 2:
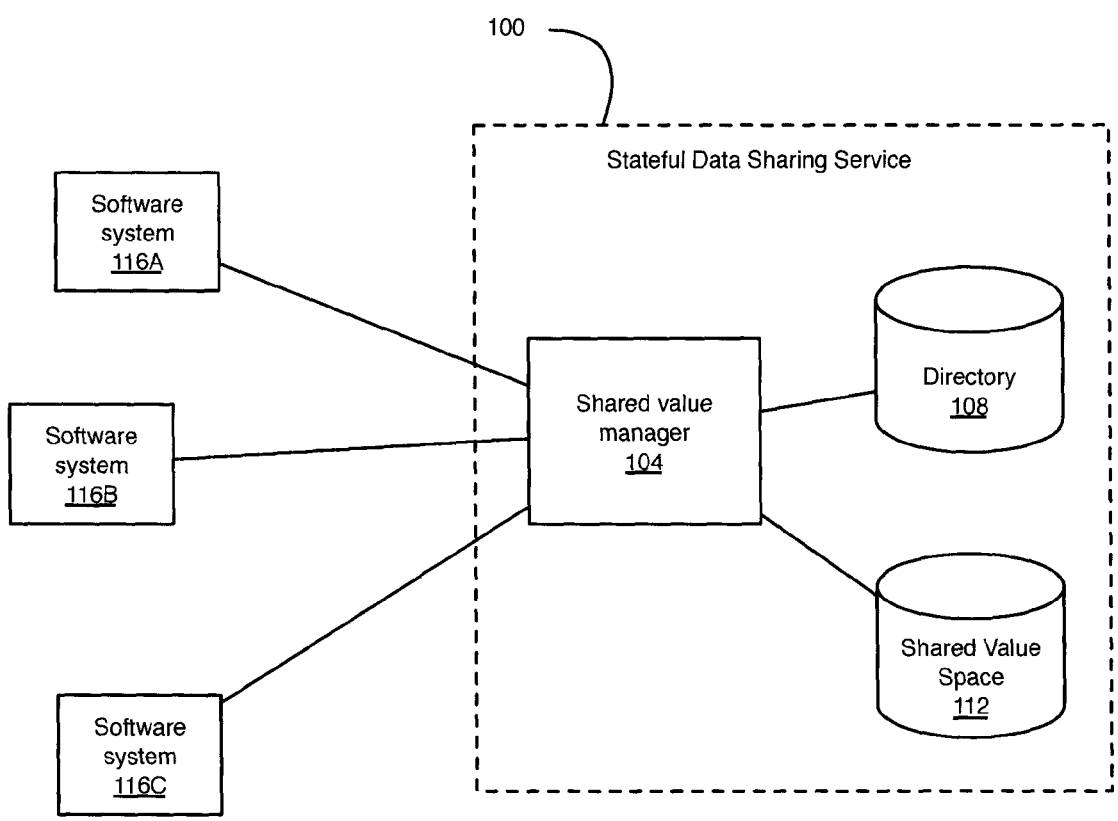
FIG. 2 shows a schematic diagram of components of a stateful data sharing service and other applications executing on the computer system of FIG. 1.

FIG. 2 shows the main components of the stateful data sharing service 100, namely a shared value manager 104, a directory 108 and a shared value space 112, as well as a number of connected software systems 116. The stateful data sharing service 100 is a Java application that is executed at startup of the computer system 20. The software systems 116 are the participants in this data sharing system that share and/or consume data items. Each software system 116 is an instance of a software system type. For example, a software system type can be an application that can be downloaded from a server on the Internet that is programmed to share and/or consume certain data items. In this example, a software system would be an executing instance of the application. Each software system type can share N data items and consume M data items. There is no required correlation between the data items shared and the data items consumed and either value may be zero, which would mean that the software system type only consumes or only shares. The software systems 116 need not have any knowledge of what the other software systems 116 share or consume, nor the existence of the other software systems 116. Further, the software systems 116 may share and consume data with other software systems 116 that may or may not be active.

The shared value manager 104 is in communication with a number of software systems 116 that supply and request data via an interface that the shared value manager 104 provides. The software systems 116 with which the shared value manager 104 communicates can include those executing on the computer system 20 and others executing on other computer systems. In particular, the interface is a web interface for receiving communications in the form of hypertext transfer protocol ("HTTP") requests. HTTP is the protocol used by web browsers to retrieve web pages from web servers. The shared value manager 104 manages the shared data set as it is published (that is, shared by software systems 116) and then subsequently provided to other software systems 116, or "consumed". The shared value manager 104 includes a query evaluator that evaluates whether data requests referred to as "standing queries" received from the software systems 116 are satisfied. In particular, the query evaluator includes a reasoner module that semantically resolves the data requested in the standing queries to data items for which values have been received, if possible. The reasoner module does this by computing inferences between the semantic description of the requested data and the semantic description of the data items in the shared value space 112. It will be appreciated that, in some cases, the reasoner module will be unable to resolve the requested data to data items in the shared value space 112. For example, the requested data may not yet be available as a particular software system type having data items to which the requested data semantically resolves may not have registered yet, or the requested data may simply not match any of the data items defined in the graph data structures definitions for software system types in the directory 108. The query evaluator then determines if values for the matched data items have been received by checking the shared value space 112. The particular query evaluator implemented in this embodiment is from Jena, an open source Java framework for building semantic web applications, information about which can be found at http://jena.sourceforge.net/. Pellet has been used for implementing the reasoner module, information about which can be found at http://clarkparsia.com/pellet/.

The directory 108 can store persistent graph data structure definitions. Each graph data structure definition represents a particular software system type and its intent to share, at some point, data item values of the types defined therein. The graph data structure definitions semantically define the data items and the relationships therebetween. The graph data structure definitions are generated using Resource Description Framework ("RDF"), a metadata data model that is defined via a family of World Wide Web Consortium ("W3C") specifications for modeling information conceptually. The graph data structure definitions provide sufficient semantics about the data items and the software systems 116 to permit useful matching and discovery of the data items shared by the software system types by the reasoner module of the shared value manager 104. In addition, the directory 108 can store one or more standing queries defined for each software system type. The standing queries are written in the SPARQL Protocol and RDF Query Language ("SPARQL") that is another W3C specification for querying information semantically. The directory 108 is generally populated with graph data structure definitions and standing queries for software system types that are expected to share data via the stateful data sharing service 100 prior to deployment. The directory 108 is stored in non-volatile storage 40 and can be copied to RAM 28 during operation of the stateful data sharing service 100 to facilitate access.

The data items have unique identifiers that are associated in the directory 108 with the formal semantic description of the data that can be used to automate processing for data matching and transformation. Each data item identifier is unique across the set of shared data. Uniqueness of the identifiers can be provided by using a standard like uniform resource identifiers ("URIs") to define the identifiers within a scope owned by the author of the software system 116, for example the domain name system ("DNS") name of the company that authored the component could be used to scope the identifier to that company with a suffix identifying the particular data item being shared. Uniqueness across all the software systems 116 enables each use of that data item identifier to reliably identify a data item with the same characteristics. In simple terms, if software system A publishes a data item with an identifier of http://example.com/2010/C1 and software system B wants to consume data with a semantic description matching that of the data item, it can count on the fact that the data item with the identifier http://example.com/2010/C1 from software system A is the expected data.

The shared value space 112 is a persistent store where data items and their associated values that are received from the software systems 116 are stored by the shared value manager 104. In addition, the shared value manager 104 stores consume requests received from the software systems 116 in the shared value space 112. Each consume request includes a standing query for the value(s) of requested data that may semantically resolve to one or more data items, when available, along with an associated address that can be used to pass values of shared data items to the software system 116. The shared value manager 104 copies the graph data structure definitions for the software system types corresponding to software systems 116 that are currently registered (i.e., active) to the shared value space 112, and thus semantic matching is only performed for data items that may have been shared by software systems 116 currently registered. The shared value space 112 is stored in non-volatile storage 40 and can be copied to RAM 28 during operation of the stateful data sharing service 100 to facilitate access.

The stateful data sharing service 100 can ensure that the software systems 116 share according to an established set of rules. For example, the shared value manager 104 ensures that each shared data item is properly identified so that its semantics can always be determined. Semantic descriptions allow the stateful data sharing service 100 to define and then process non-explicit relationships between the shared data. Semantics enable, for example, two different properties like "YearsOld" and "Age" to be equated; even something this simple can require extensive rework without semantic descriptions, especially over a large number of software systems. As information is changed in the shared data set stored in the shared value space 112, the software system 116 may be informed by the shared value manager 116 of the changes so they can respond to the current information state.

The description of the data items and the software systems 116 that share or consume them enables the software systems 116 to declare their shared and consumed items in a manner that is independent of their internal representation and allows them to be unambiguously identified. The use of semantics allows the shared value manager 104 to properly determine the relationships between data items and software systems 116 without point-to-point connections established by the software systems themselves.

When the software systems 116 wish to share data with and receive data from the instantiated graph data structures storing the shared data in the shared value space 112, they submit a registration request to the shared value manager 104. The registration request identifies the sender's software system type. In addition, the registration request can include a description of the data being shared, and one or more consume requests. As previously noted, each consume request includes a standing query for requested data that may semantically resolve to one or more data items, along with an address associated with the standing query that enables passing values for shared data items to the particular instance of the software system. The address identifies the means by which the software systems 116 should be provided values for the requested data. Exemplary addresses can include, for example, the address of a JavaScript function or a uniform resource locator ("URL") for a web service endpoint. The shared value manager 104 monitors changes in the values of the data items that are shared by the software systems 116. Upon detecting a change/update to the value of a data item, the shared value manager 104 determines which registered consume requests are satisfied. Consume requests are evaluated when any of the values in the shared data space 112 are added, updated or removed. Consume requests are then deemed to be satisfied if the query evaluator can find a different set of values for the consume requests in the shared value space 112 than previously found. For each standing query that returns results, the shared value manager 104 makes a call to the address declared by the software system 116 in the corresponding consume request, and passes the data item values to the software system 116 with the call. Thus, by storing consume requests that include standing queries and a method (i.e., the address) for the shared value manager 104 to notify the software systems 116 of the results of the standing queries, once available, the stateful data sharing service 100 can enable asynchronous data sharing.

Figure 3:
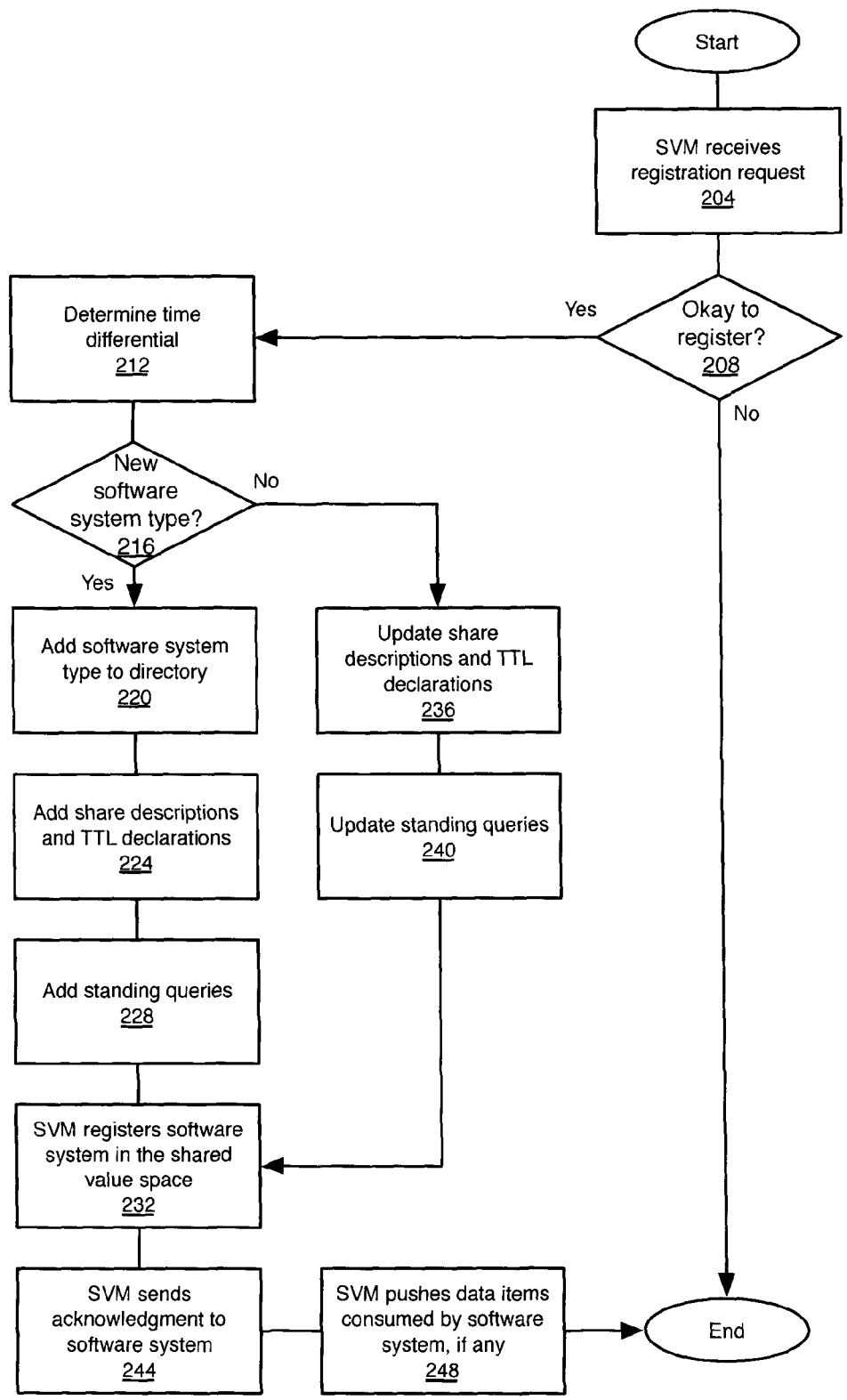
FIG. 3 shows the general method of registering software systems by the stateful data sharing service of FIG. 2.

The general method used by the stateful data sharing service 100 to register software systems 116 to enable them to participate in data sharing will now be described with reference to FIGS. 2 and 3. In the method, generally identified at 200, the shared value manager 104 receives a registration request from a software system 116 and determines whether the software system 116 corresponds to a software system type expected; that is, a software system type previously defined in the directory 108. Depending on whether the software system 116 is recognized, the shared value manager 104 either updates the information in the directory 108 for the particular software system type based on the registration request, or creates a new software system type in the directory 108 and adds the information provided in the registration request. The share value manager 104 then instantiates the graph data structure definition in the directory 108 in the shared value space 112 for the software system 116. In addition, the shared value manager 104 adds the consume requests provided with the registration request The method commences with the receipt of a registration request by the shared value manager 104 (204). Software systems 116 can be configured to generate a registration request upon initialization or at other times. The registration request is in the form of an HTTP request. The registration request includes a participant identification that identifies the type of the software system 116 that generated the registration request. The participant identification is in the form of a URI and is set by the author of the software system type. In one model for participant identification, the participant identification includes the DNS name of the company that created them to ensure uniqueness. For example, a software system type's participant identification could be "http://example.com/twid/2010/02/client1". The registration request may also include one or more share descriptions and/or consume requests. The share descriptions take the form of a set of "triples" that define the data items to be shared. Each triple defines a relationship between a previously-defined node and another node, thereby forming a graph data structure definition. For example, where a software system type shares a single value, a first triple can define a first share type for the software system type, and a second triple can define that the first share type includes a value.

In addition, the share descriptions can include a set of triples defining lifetime information about a data item. A first triple enables registration of the effective time of the data (i.e., typically the time of generation of the data by the software system). A second triple enables registration of the lifetime period of the data item, in milliseconds, from the effective time of the data. Where there is no triple defining lifetime information about a data item, the data item is assumed to be valid until the data item is replaced or nullified.

Also included in the registration request is clock synchronization information to enable the stateful data sharing service to register the perceived differential between its clock and that of the transmitter of the registration request. Where software systems executing on separate computer systems are sharing data, it is desirable to be able to accurately understand any time information received with the shared data. The stateful data sharing service can compare the clock synchronization information (which is effectively the clock time for the computer system that generated the registration request), to its internal clock time to determine the differential. This can then be used to adjust time information received from the particular software system.

Upon receipt of a registration request, the shared value manager 104 determines if the registration request is okay to register (208). This decision can, for example, be based on security constraints limiting registrations to come from a known source. If the shared value manager 104 determines that the registration request should not be accepted, the method 200 ends.

If, instead, the shared value manager 104 determines that the registration request should be accepted, the shared value manager 104 determines the time differential between the time as maintained by the internal clock and the clock synchronization information received with the registration request (212). Upon calculating this differential, the shared value manager 104 stores it for future reference.

The shared value manager 104 then determines if the registration request identifies a known software system type or a new software system type (216). In particular, the shared value manager 104 compares the participant identification URI in the registration request to those of registered software system types stored in the directory 108. If the participant identification URI does not match one for a registered software system type, the shared value manager 104 adds the software system type to the directory 108 (220).

In addition, the shared value manager 104 adds any share descriptions and TTL declarations provided with the registration request to the directory 108 (224). The shared value manager 104 processes each triple to build a graph data structure definition that is stored in the directory 108. In addition, the shared value manager 104 registers any TTL declarations for data item types received with the share descriptions. Data item types can have TTL defined for them via declarations provided with the share descriptions. In this manner, data items of the same type can be attributed with a common lifetime without the need to express the TTL each time the data item is provided by a software system 116.

Next, the shared value manager 104 adds any consume requests included with the registration request (228). In particular, the shared value manager 104 adds the standing queries identified the consume requests, if any, to the directory 108. Upon adding all the appropriate entries to the directory 108, the shared value manager 104 registers the software system 116 in the shared value space (232). The shared value manager instantiates the graph data structure definition from the directory 108 in the shared value space 112 in preparation for receiving values from the software system 116. In addition, the shared value manager 104 adds any consume requests provided with the registration request in their entirety to the shared value space 112.

If, instead, the shared value manager 104 determines at 216 that the participant identification URI provided in the registration request matches one for a software system type stored in the directory 108, the shared value manager 104 updates the share descriptions and any TTL declarations in the directory 108 for any provided with the registration request (236). In doing so, the shared value manager 104 may add or remove nodes (that is, data items) from the graph data structure definition stored in the directory 108 for the software system type. In addition, the shared value manager 104 amends any TTL declarations for data item types received with the share descriptions where they have changed.

Then, the shared value manager 104 updates the standing queries for the software system type in the directory 108 for those included in any consume requests that accompany the registration request (240). In doing so, the shared value manager 104 may add or remove standing queries stored in the directory 108 for the software system type. Upon updating the directory 108, the method proceeds to 232, at which point the shared value manager 104 registers the software system 116, and any consume requests provided with the registration request, in the shared value space 112.

After registration of the software system 116 in the shared value space 112 at 232, the shared value manager 104 sends an acknowledgement to the software system 116 (244). The acknowledgement is accompanied by a token that identifies the particular instance of the software system type in the shared value space 112 that is generated by the shared value manager 104. By assigning unique identifiers for each instance of the software system types, the shared value manager 104 can allow multiple instances of the same software system type (for example, many instances of the same application) to share and receive data. The shared value manager 104 then pushes the value of data items consumed, if any, by the software system 116 (248). The shared value manager 104 examines the registered consume requests for the software system 116 in the shared value space 112 and determines if any are satisfied using data that is still live (i.e., not invalid). If a consume request is satisfied, the shared value manager 104 calls the address in the consume request and passes the values for data items that semantically match the data requested in the standing query to the software system 116, as well as a version identification for those values, discussed hereinbelow.

Once the shared value manager 104 has fulfilled any satisfied consume requests for the newly-registered software system 116, the method 200 of registering the software system 116 is complete.

After a software system 116 has registered, it may share data with the stateful data sharing service 100. The data to be shared may be generated by the software system 116 independent of the stateful data sharing service 100 as part of a new transaction, or may be generated in response to receiving data from the stateful data sharing service 100 and form part of that existing transaction.

Transactions are sets of one or more logically-related operations performed on data. One or more software systems 116 can cooperatively perform the operations without knowledge of each other's existence or functions. When a set of data item values that was independently generated is shared via the stateful data sharing service 100, it is referred to as the root of a transaction and is assigned a new transaction version identification. As any of the root set of data item values is used by other software systems 116 to generate values for additional data items, those data item values form part of the same transaction and are assigned the same version identification. Software systems 116 receive the current transaction version identification when they are notified with values matching their consume requests and use this transaction version information to properly coordinate their participation across multiple transactions. The shared value manager 104 ensures that properly implemented software systems 116 produce the expected results. In this manner, the stateful data sharing service 100 tracks and segregates values for separate transactions, ensuring that the values for separate transactions are not mixed.

The shared value manager 104 orchestrates the transactions by simply receiving requests for data, and responding to the requests when values for data items that semantically match the requested data are available. The declarations of share definitions and consume requests by the software systems 116 enable such transactions to be data-driven.

The method of receiving and providing shared data item values by the stateful data sharing service 100 will now be described with reference to FIGS. 1 to 5.

Figure 4:
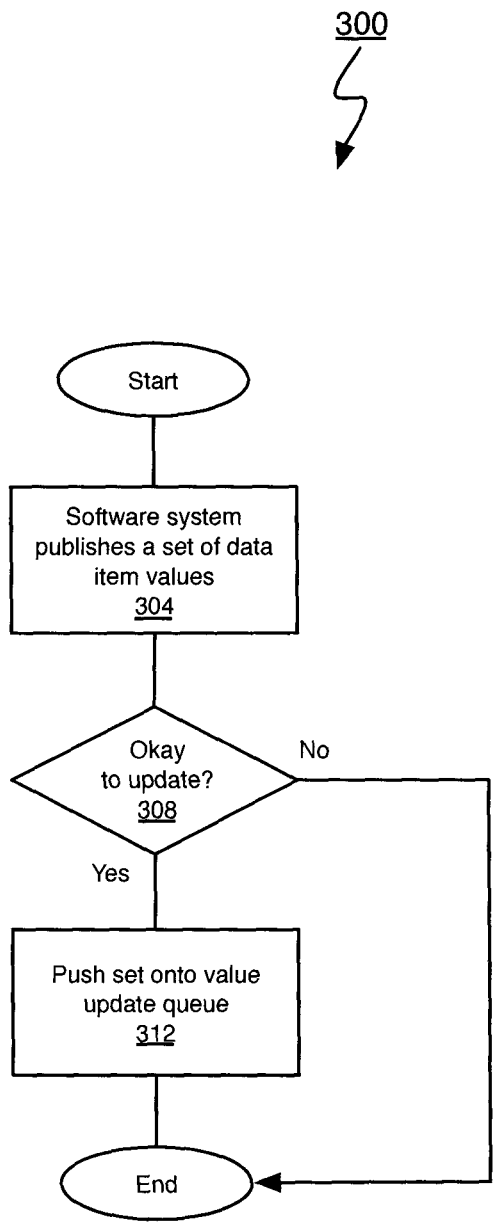
FIG. 4 shows the general method of processing incoming data item values from software systems by the stateful data sharing service of FIG. 2.

FIG. 4 shows the method of pre-processing data items shared by a software system 116 generally at 300. The method 300 commences with a software system 116 publishing a value of one or more data items (304). The software system 116 provides the following as parameters of an HTTP request to the stateful data sharing service 100: the URI identifying the particular instance of the software system type of the software system 116, a data item identifier URI for each data item identifying what is being shared, value(s) for the shared data items, and a version identification for the set of data item value(s), if any, used to generate the data item value being published. In addition, the HTTP request can also include the following parameters: an effective time for the data item, and a lifetime for the data item.

If a software system 116 generates one or more data item values based on data item values previously received from the shared value manager 104 (i.e., that form part of the same transaction), the shared value manager 104 can, upon receipt of the published set of updated data item values from the software system 116 and the version identification for the set of data items, determine if the values relied upon in generating the set of data item values published are still valid. That is, the shared value manager 104 determines if a set of data item values received correspond to an outdated or current transaction. The shared value manager 104, upon receipt of the set of shared data item values, determines if it is okay to update the shared value space 112 for the set of shared data item values (308). In particular, the shared value manager 104 compares the data items published to the share definitions stored in the directory 108 for the software system type of the software system 116 that published the data item values. If any data item published does not correspond to share definitions stored in the directory 108 for the particular software system type, the shared value manager 104 discards the published set of data item values and the method 300 ends.

If, instead, the set of data items published correspond to share definitions stored in the directory 108 for the particular software system type, the shared value manager 104 pushes the published set of data item values onto a value update queue that it maintains (312). The shared value manager 104 also includes any version identification received with the data item values, as well as any lifetime information for the data items. After placement of the set of data item values in the value update queue, the method 300 ends.

The shared value manager 104 then processes the sets of data item values in the value update queue. In some cases, a software system 116 may generate and publish a set of data item values in response to receiving a set of data item values from the shared value manager 104 corresponding to one of its consume requests. The shared value manager 104, however, may know that the values used by the software system 116 are obsolete due to a subsequent update in the shared value space 112 or due to the expiry of the data items. In this case, the shared value manager 104 discards the set of data item values received from the software system 116 as it knows they may no longer be valid. To this end, the shared value manager 104 maintains version information for the values of the data items stored in the shared value space 112.

In particular, the shared value manager 104 assigns a unique version identification to each set of data item values that form part of a transaction.

Figure 5:
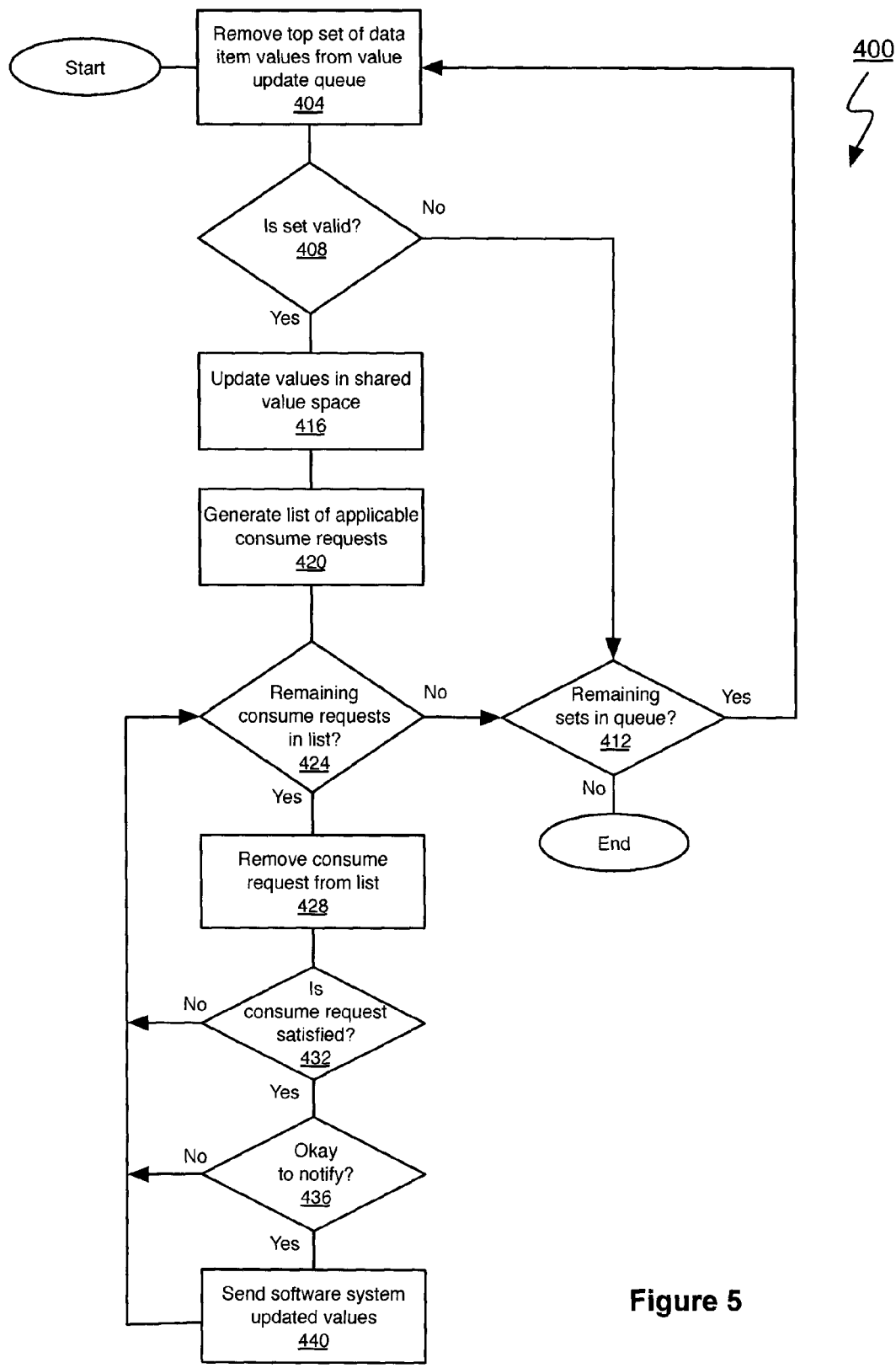
FIG. 5 shows the general method of processing data item values received from software systems by the stateful data sharing service of FIG. 2.

FIG. 5 shows the method of processing sets of data item values in the value update queue generally at 400. This method 400 is executed whenever the value update queue has at least one set of data item values for updating in it. The method 400 begins with the removal of a set of data item values from the value update queue (404). The shared value manager 104 generally processes sets of data item values in the order that they are received. The set of data item values may be accompanied by a version identification for the transaction to which the data item values belong as well as lifetime information for the data items. The shared value manager 104 then determines if the data item values in the set removed from the value update queue are valid (408). In particular, the shared value manager 104 determines if the data items are part of a current or new transaction. If the set of data item values removed from the value update queue was not accompanied by a version identification, the set of data item values are taken to begin a new transaction and are deemed to be valid by the shared value manager 104. If the set of data item values removed from the value update queue were accompanied by a version identification, the shared value manager 104 examines the version identification to determine if it is still current. That is, the shared value manager 104 determines if the set of data item values put into the value update queue correspond to an outdated or current transaction. If the data items are part of a prior transaction, the data items are deemed to be invalid.

If the data items are deemed invalid at 408, the shared value manager 104 then determines if there are remaining sets of data item values left in the value update queue (412). If there are remaining sets of data item values in the value update queue, the method returns to 404, at which another set of data item values is removed from the value update queue. If, instead, there are no remaining sets of data item values in the value update queue, the method 400 ends.

If, instead, the set of data item values removed from the value update queue are determined to be valid (i.e., part of the current transaction or a new transaction) by the shared value manager 104 at 408, the shared value manager 104 updates the set of data item values in the shared value space 112 (416). If the set of data item values does not have a version identification, then the shared value manager 104 also generates a new unique version identification for the set of data item values placed in the shared value space 112. In addition, any TTL information included with the data item values is registered.

During the update at 416, the shared value manager 104 also determines whether each of the data items are still live. If the data items do not have an associated lifetime, as indicated by a finite TTL property, or have an associated lifetime that has not expired, they are deemed to be live/valid and are included in the update. If, instead, the data items have an associated lifetime that has expired, they are deemed to be expired/invalid and are not included in the update. The effect on the system is the same as if those values were not included in the original set of shared values.

Once the shared value manager 104 has updated the shared value space 112 for the new data item values, the shared value manager 104 generates a list of registered consume requests that might include the updated data items (420). In the default configuration, the shared value manager 104 places all consume requests in this list as, in many scenarios, it can be less processor-intensive to process all consume requests rather than determine which are applicable. The shared value manager 104 only reviews consume requests in the shared value space 112; that is, registered consume requests for software systems 116 that are believed to be active. The list of consume requests generated at 420 may be empty or may include one or more consume requests. The shared value manager 104 then determines if there are any remaining consume requests in the list (424). If there are no remaining consume requests for the data item values updated, then the updating of the data item values is complete and the shared value manager 104 determines if there are remaining sets of data item values in the value update queue at 412.

If, instead, there are remaining consume requests in the list generated at 420, then the shared value manager 104 removes a consume request from the list (428). The shared value manager 104 determines if the consume request removed from the list is satisfied (432). As previously noted, consume requests are satisfied if the query evaluator can semantically resolve the data requested in the included standing query to valid data item values in the shared value space 112 using the semantic descriptors for those data items; that is, if the standing query returns results. In addition, changes to these data items such as the redaction of a value also triggers the evaluation of a consume request. If the consume request is not satisfied, the shared value manager 104 determines if there are remaining consume requests in the list at 424. If the consume request is satisfied, the shared value manager 104 determines if it is okay to notify the software system 116 associated with the consume request (436). In some cases, it can be specified that certain data items are only shared with certain software systems 116 and/or software system types. If the shared value manager 104 determines that it is not okay to notify the software system 116, the shared value manager 104 determines if there are remaining consume requests in the list at 424. If the shared value manager 104 determines, instead, that it is okay to notify the software system, the shared value manager 104 sends the software system 116 the results of the consume request (440). The shared value manager 104 calls the address identified in the consume request, passing the results to the software system 116 as parameters of the call. The software system 116 uses the information it receives from the shared value manager 104 in the function call to determine what action(s) to perform. For example, the software system 116 can update displayed information, perform calculations, store the returned data item values, etc. in response to receiving new information. After the results are provided to the software system 116, the shared value manager 104 determines if there are remaining consume requests in the list at 424. Once the shared value manager 104 determines that there are no remaining consume requests in the list at 424, the method 400 proceeds to 412, where the shared value manager 104 determines if there are remaining sets of data item values to be updated in the value update queue.

It is undesirable to process consume requests for software systems 116 that are no longer active. In order to ensure that the shared value manager 104 only processes consume requests for active software systems 116 in the shared value space 112, standing queries for inactive software systems 116 are removed from the shared value space 112. When a software system 116 is becoming inactive (i.e., shutting down), the software system 116 transmits a "deregister" notification with its unique identifier to the shared value manager 104. In response, the shared value manager 104 notes the deregistration of the software system 116 and removes the consume requests of the software system 116 from the shared value space 112. Additionally, the shared value manager 104 sends activity confirmation requests to the registered software systems 116 periodically to ensure that they are still active. The shared value manager 104 maintains the values in the shared value space 112 provided by a software system 116 that deregisters, unless directed otherwise by the software system 116.

During regular operation, the shared value manager 104 monitors the expiry of data items in the shared value space 112. It routinely examines each TTL expression to determine if the associated data item has expired.

Figure 6:
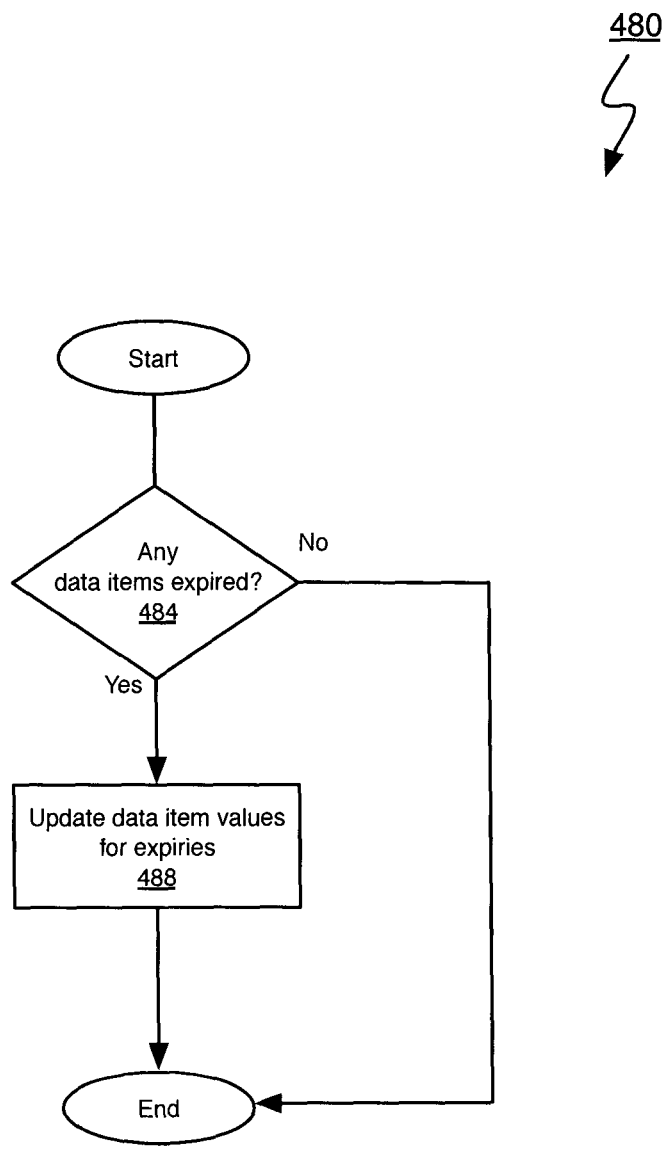
FIG. 6 shows the general method of monitoring expired data items used by the stateful data sharing service of FIG. 2.

FIG. 6 shows the general method of monitoring the expiry of data items in the shared value space 112 at 480. The method 480 commences with the shared value manager 104 examining the TTL declarations that were registered to determine if any of the associated data items have expired (484). If any of the data items have expired, the data item values are removed from the shared value space 112 held by the shared value manager 104 (488). Since the removal of a data item from the shared value space 112 is a change to the shared values, that change triggers the evaluation of the consume requests of the registered software systems 116. Upon completing the evaluation of the data item values for expiry, the method 480 ends, but is repeated again shortly.

In order to illustrate the function of the computer system 20 for sharing data, it will now be described with respect to an exemplary scenario with back reference to FIGS. 1 to 7.

Figure 7:
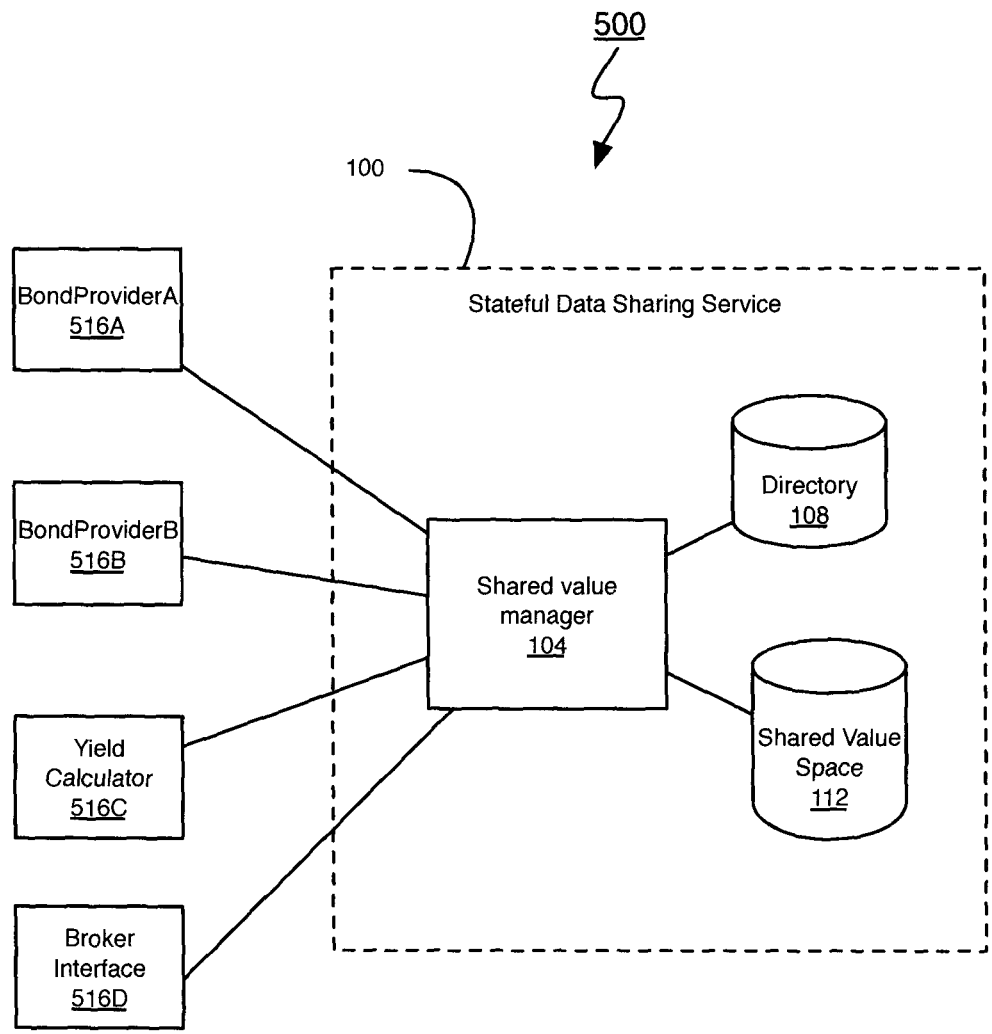
FIG. 7 shows a set of software systems and the stateful data sharing service of FIG. 2 in an exemplary scenario.

An exemplary configuration of the computer system 20 for a bond broker is shown in FIG. 7. Four software systems on the computer system 20 interact to collectively provide a solution. A first software system 516A, referred to as "Bond-ProviderA", is a web browser-based application that retrieves data from a server operated by a provider of bonds. BondProviderA 516A provides various details about bonds that are available through them, including the bond face value, the bond or coupon rate, the length of the interest period, the redemption date and the redemption value. As will be understood, other details such as currency type, whether the bonds can be called, etc. may be communicated by BondProviderA 516A, but are not discussed herein to reduce the complexity of the example. In addition, BondProviderA 516A provides a price at which the bond is being offered, together with the effective time of the price and the period from the effective time of the price for which the price is guaranteed. BondProviderA 516A retrieves updated information from the server of the provider of bonds frequently to reflect changes in the prices for the bonds. Preferably, BondProviderA 516A retrieves updated bond and price information more frequently than the expiry of the information; that is, it is desirable that BondProviderA 516 has new bond and price information available to display before the expiry of the older bond and price information.

A second software system 516B, referred to as "BondProviderB", is a software system executing on another computer of a separate provider of bonds that shares bond data, including prices. BondProviderB 516B provides a simple web service interface to retrieve bond information, and that web service is used to share information with the shared value manager 104. Unlike BondProviderA 516A, it does not present a visible user interface on the computer system 20. BondProviderB 516B also provides a TTL for its price as an effective time and a guaranteed time period for the price from the effective time.

A third software system 516C, referred to as "YieldCalc", is an application that determines effective rates of return for bonds, given details for them. This software system is made available from a web site outside of the broker's computer system 20. The stateful data sharing service facilitates integration with the third-party YieldCalc 516C. Information privacy is preserved because only anonymous information (i.e., generic details of the bonds) is exchanged. YieldCalc 516C receives the set of available bond information based on the consume request it has registered with the shared value manager 104. The consume request includes the following for each bond: the face value, the bond rate, the coupon frequency, the redemption date, the redemption value and the price. The consume request is only satisfied for each individual bond if the shared value manager 104 has all the required information for that bond, including price. When it receives a set of bond information, YieldCalc 516C calculates the yield rate (that is, the effective annual rate of return) for the bonds and then shares the calculated value with the shared value manager 104. The set of bonds that satisfy the consume request may be empty, meaning that no bond information is currently available.

A fourth software system 516D, referred to as "BrokerInterface", is a web browser-based application that provides a dashboard for a broker. Brokerinterface 516D displays bonds that satisfy its consume request which includes all bond information from the bond providers 516A and 516B, as well as the yield calculation from YieldCalc 516C.

The consume request for YieldCalc 516C includes the price since the price is required to calculate the yield. That means that when the price expires, the consume request for YieldCalc 516C is no longer satisfied for the bonds with the expired prices which changes the result of the consume request. The shared value manager 104 automatically delivers the new result (the set of bonds that now satisfy the request which now excludes those bonds whose price has expired) of the consume request to YieldCalc 516C, which then calculates the yield rates for that set of bonds and shares those yield rates. This results in a changed value of the consume request for BrokerInterface 516D so a new set of bond information is delivered to BrokerInterface 516D. BrokerInterface 516D displays the new set of bond information.

Of significance is that the stateful data sharing system does not have to poll either BondProviderA 516A or BondProviderB 516B to ensure that the displayed information was accurate. The expiry of the price information and the update of all internal systems happened because of the TTL information that was expressed along with the original information.

Each of BondProviderA 516A, BondProviderB 516B, Yieldalc 516C and BrokerInterface 516D are defined software system types in the directory 108. None of the software systems 516A, 516B, 516C and 516D have knowledge of each other, nor the functions that the other software systems provide.

Figure 8:
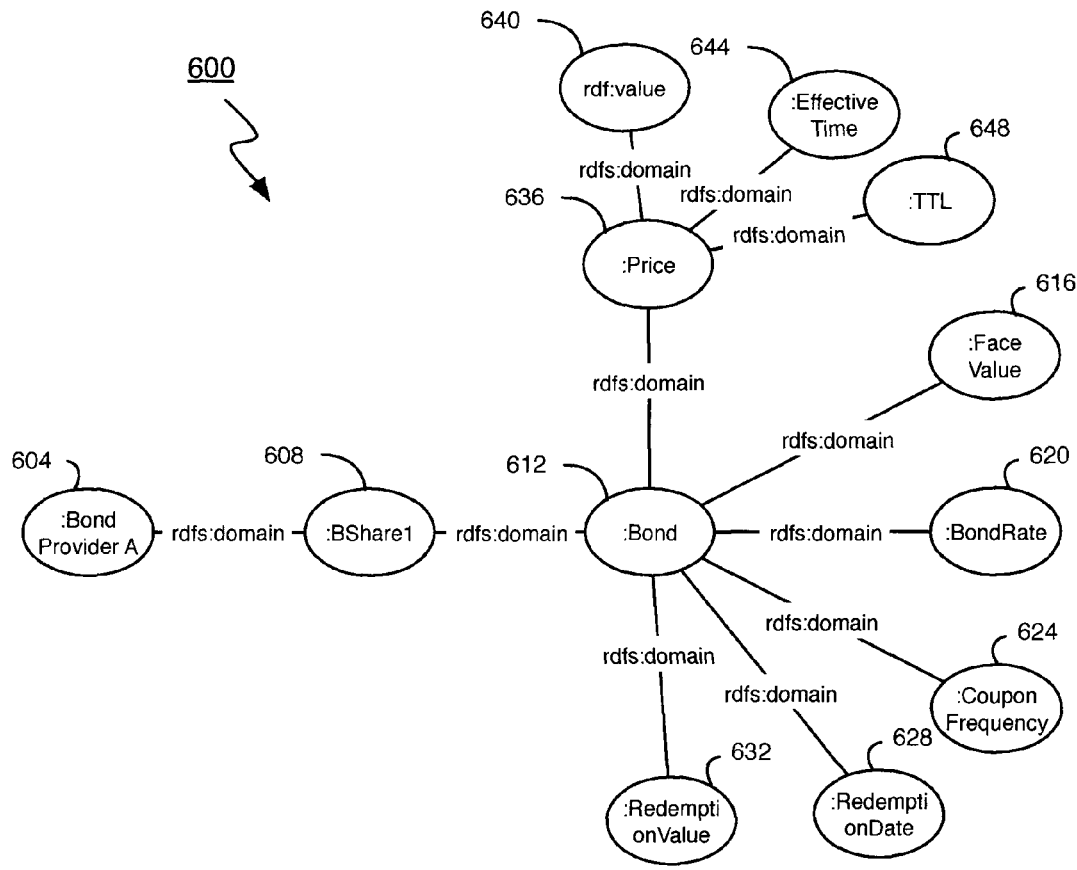
FIG. 8 illustrates a graph data structure definition for the data shared by the BondProviderA and BondProviderB software systems of FIG. 7.

FIG. 8 shows the graph data structure definition for the data items shared by BondProviderA 516A generally at 600. BondProviderA 516A is represented by a first node 604. As shown, BondProviderA 516A defines a set of values that it shares and gives that set the identifier BShare1 608. The BShare1 608 includes a bond, represented by Bond 612. Although it is not illustrated here, BondProviderA 516A could share other sets of values, giving each set its own identifier.

The following table illustrates the "triples" that are used to define the graph data structure shown in FIG. 8:

| Subject | Predicate | Object | Reference Number | Description |
|---|---|---|---|---|
| :B Share 1 | rdfs:domain | :BondProviderA | 608 | BShare1 is a property of BondProviderA |
| :Bond | rdfs:domain | :BShare1 | 612 | Bond is a property of BShare1 |
| :Face Value | rdfs:domain | :Bond | 616 | FaceValue is a property of Bond |
| :BondRate | rdfs:domain | :Bond | 620 | BondRate is a property of Bond |
| :Coupon Frequency | rdfs:domain | :Bond | 624 | CouponFrequency is a property of Bond |
| :Redemption Date | rdfs:domain | :Bond | 628 | RedemptionDate is a property of Bond |
| :Redemption Value | rdfs:domain | :Bond | 632 | RedemptionValue is a property of Bond |
| :Price | rdfs:domain | :Bond | 636 | Price is a property of Bond |
| rdf:value | rdfs:domain | :Price | 640 | Value is a property of Price |
| :Effective Time | rdfs:domain | :Price | 644 | EffectiveTime is a property of Price |
| :TTL | rdfs:domain | :Bond | 648 | TTL is a property of Price |

The first part of each of these triples is a prefix used as a short form for the rest of the URI. There are three prefixes used in this example: "rdfs:", "rdf:", and ":". Each of these prefixes can refer to a different URI prefix. When combined with the suffix, they form a full, unambiguous and unique URI.

The information shared by BondProviderB 516B is the same as that shared by BondProviderA 516A and will thus not be discussed.

Both BondProviderA 516A and BondProviderB 516B do not declare global TTL values in the definitions of the graph data structures that they share, but simply declare that TTL values for price may be provided at the time that data items are shared.

Figure 9:
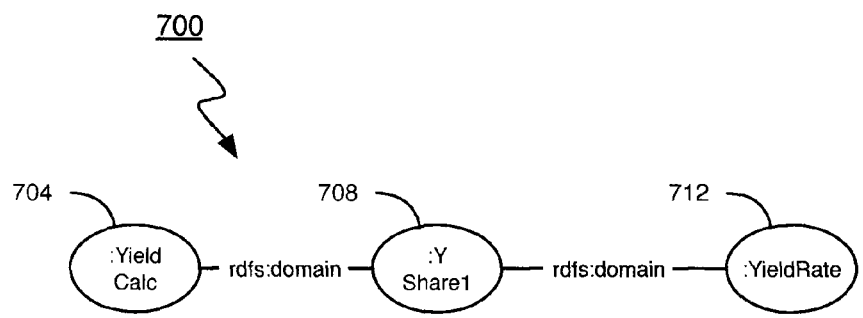
FIG. 9 shows the data item value being shared by the YieldCalc software system of FIG. 7.

FIG. 9 shows the graph data structure definition for the data items shared by YieldCalc 516C generally at 700. YieldCalc 516C is represented by a first node 704. As shown, YieldCalc 516C defines a set of values that it shares and gives that set the identifier BShare1 708. The BShare1 708 has a property of YieldRate 712.

The following table illustrates the triples that are used to define the graph data structure shown in FIG. 8:

| Subject | Predicate | Object | Description |
|---|---|---|---|
| :YShare1 | rdfs:domain | :YieldCalc | YShare1 is a property of YieldCalc |
| :YieldRate | rdfs:domain | :YShare1 | YieldRate is a property of YShare1 |

In addition, at registration, YieldCalc 516C also communicates a consume request for bond particulars. The structure for this consume request is presented below:

| Consume Request Identifier | Standing Query | Address |
|---|---|---|
| :YieldCalc#CR1 | CONSTRUCT<br>{<br>  ?bfacevalue :Face Value ?bond.<br>  ?bbondrate :BondRate?bond.<br>  ?bcouponfrequency<br>:CouponFrequency?bond.<br>  ?bredemptiondate :RedemptionDate?bond.<br>  ?bredemptionvalue<br>:RedemptionValue?bond.<br>  ?bprice :Price?bond.<br>  ?bvalue :Price?bond.<br>}<br>WHERE<br>{<br>  ?bfacevalue :FaceValue ?bond;<br>  ?bbondrate :BondRate ?bond;<br>  ?bcouponfrequency :CouponFrequency ?bond;<br>  ?bredemptionrate :RedemptionRate ?bond;<br>  ?bredemptionvalue :RedemptionValue ?bond;<br>  ?bprice :Price ?bond;<br>  ?bvalue:Price ?bond;<br>} | onBondData |

The single consume request defined by YieldCalc 516C is identified as ":YieldCalc#CR1". The standing query returns the current value of the face value, the bond rate, the coupon frequency, the redemption rate, the redemption value and the price where they are related to the same instance of a "Bond". Associated with that consume request is the address of a JavaScript function "onBondData" within YieldCalc 516C that should be notified when the consume request is satisfied. YieldCalc 516C has been written to be a general client, it requests to consume the face value, the bond rate, the coupon frequency, the redemption rate, the redemption value and the price of a bond.

BrokerInterface 516D does not share any values with other software systems and only consumes data. In particular, BrokerInterface 516D communicates a consume request for each of a bond's face value, bond rate, coupon frequency, redemption date, redemption value, price, and yield rate. The structure for this consume request is presented below:

Data sharing between the various components of the exemplary scenario of FIG. 7 will now be described with reference to FIGS. 1 to 15. The data sharing is initiated as a result of either of BondProviderA 516A or BondProviderB 516B providing a new bond offering/price. For purposes of this example, it is assumed that BondProviderA 516A, BondProviderB 516B, YieldCalc 516C and BrokerInterface 516D have all previously registered with the stateful data sharing service 100. It will be understood, however, that this need not be the case.

Figure 10:
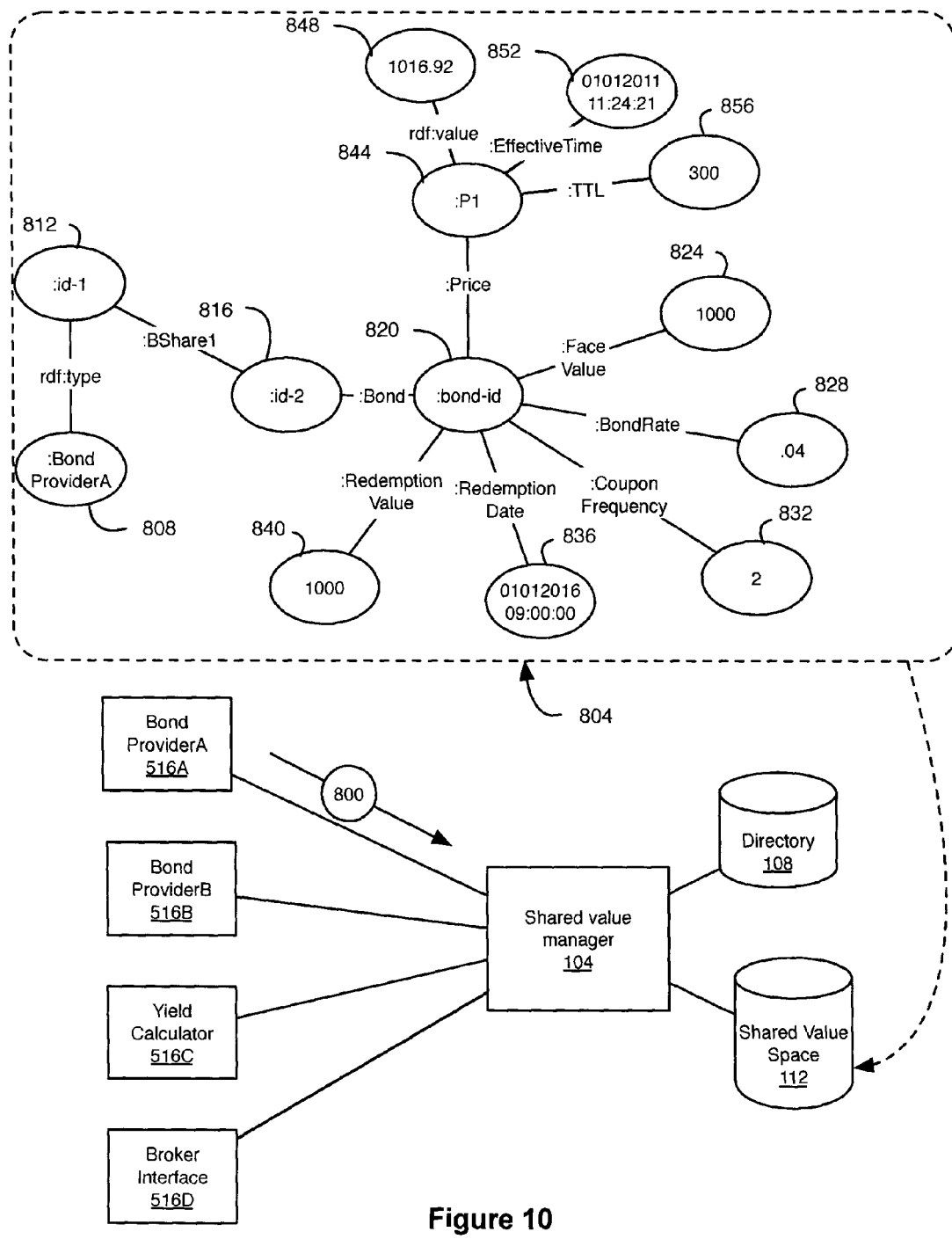
FIG. 10 shows data being shared by a first of the bond provider software systems of FIG. 7.

FIG. 10 shows BondProviderA 516A sending a communication 800 to the shared value manager 104 that includes a set of parameters, and a set of data item values provided as a set of triples that form a graph data structure 804. The parameters identify the instance of the software system type that BondProviderA 516A is and the type of share that BondProviderA 516A is providing. In particular, a software system type BondProviderA 808 is shown having an

| Consume Request Identifier | Standing Query | Address |
|---|---|---|
| :BrokerInterface#CR1 | CONSTRUCT<br>{<br>    ?bfacevalue :FaceValue ?bond.<br>    ?bbondrate :BondRate?bond.<br>    ?bcouponfrequency :CouponFrequency?bond.<br>    ?bredemptiondate :RedemptionDate?bond.<br>    ?bredemptionvalue :RedemptionValue?bond.<br>    ?bprice :Price?bond.<br>    ?bvalue :Price ?bond.<br>    ?byieldrate :YieldRate ?bond.<br>}<br>WHERE<br>{<br>    ?bfacevalue :FaceValue ?bond;<br>    ?bbondrate :BondRate ?bond;<br>    ?bcouponfrequency :CouponFrequency ?bond;<br>    ?bredemptionrate :RedemptionRate ?bond;<br>    ?bredemptionvalue :RedemptionValue ?bond;<br>    ?bprice :Price ?bond;<br>    ?bvalue :Price?bond;<br>    ?byieldrate :YieldRate ?bond;<br>} | http://example.com/bondanalysis.asmx |

The single consume request defined by BrokerInterface 516D is identified as ":BrokerInterface#CR1". Associated with that consume request is the address of a web service "http://example.com/bondanalysis.asmx" for BrokerInterface 516D that should be notified when the consume request is satisfied.

instance id-1 812. The particular instance id-1 812 of the software system is providing a share id-2 816. The share id-2 816 includes a bond bond-id 820. The set of triples sent by the particular instance id-1 812 of BondProviderA 516A for bond-id 820 are shown below, together with a description of what each triple states.

| Subject | Predicate | Object | Reference Number | Description |
|---|---|---|---|---|
| :bond-id | :FaceValue | 1000 | 824 | bond-id has a face value of "1000" |
| :bond-id | :BondRate | .04 | 828 | bond-id has a bond rate of ".04" |
| :bond-id | :CouponFrequency | 2 | 832 | bond-id has a coupon frequency of "2" |
| :bond-id | :RedemptionDate | 01012015 09:00:00 | 836 | bond-id has a redemption date of "01012015 09:00:00" |
| :bond-id | :RedemptionValue | 1000 | 840 | bond-id has a redemption value of "1000" |
| :bond-id | :Price | :P1 | 844 | bond-id has a price, P1 |

-continued

| Subject | Predicate | Object | Reference Number | Description |
|---|---|---|---|---|
| :P1 | rdf:value | 1016.92 | 848 | Price has a value of "1016.92" |
| :P1 | :EffectiveTime | 01012011 11:24:21 | 852 | Price has an effective time of "01012011 11:24:21" |
| :P1 | :TTL | 300 | 856 | Price has a TTL of "300" |

Note that ":bond-id" is a non-private unique identifier in this example that is generated by BondProviderA 516A for external use. The shared value manager 104 generates identifiers for the instance of the software system type and the share at registration time. For illustration purposes, these values are "id-1" and "id-2" respectively.

In addition, the graph data structure 804 that the shared value manager 104 generates in the shared value space 112 as a result of receiving the parameters and shared data item values from BondProviderA 516A is shown. As will be appreciated, BondProviderA 516A has shared a bond that is has a face value of 1000, a bond rate of 4%, a coupon frequency of semi-annually, a redemption date of Jan. 1, 2015 at 9:00 am, a redemption value of 1000, a price of 1016.92, an effective time of Jan. 1, 2011 11:24:21 and a TTL of 300 seconds.

Upon receiving the data item values, the shared value manager 104 executes the methods 300 and 400. As a result, the shared value manager 104 determines that the consume request submitted by YieldCalc 516C has been satisfied.

Figure 11:
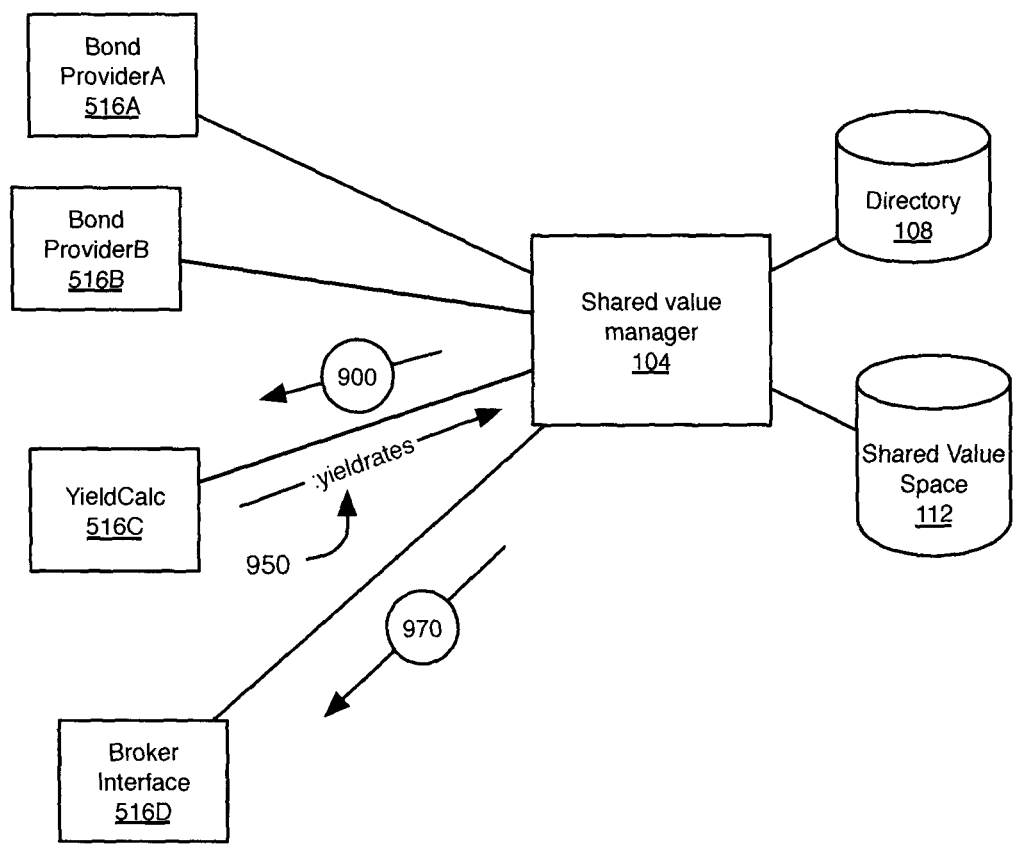
FIG. 11 shows a consume request of YieldCalc being fulfilled by the shared value manager, and YieldCalc, in response, sharing data that is then passed on to BrokerInterface.

FIG. 11 shows the shared value manager 104 fulfilling the consume request of YieldCalc 516C by making a call 900 to the address identified in the consume request to YieldCalc 516C with the ":FaceValue", ":BondRate", ":CouponFrequency", ":RedemptionRate", ":RedemptionValue", and ":P1" data item values provided by BondProviderA 516A as parameters, as well as the version identification for the transaction to which they belong.

YieldCalc 516C is configured such that, upon receiving these values, it calculates an effective yield rate, which YieldCalc 516C has indicated it would share with the stateful data sharing service 100. YieldCalc 516C is shown sharing this in a communication 950 with the shared value manager 104.

Once the shared value manager 104 notices that the consume request submitted by the BrokerInterface 516D has been satisfied, it fulfills the consume request by making a call 970 to the address identified in the consume request of BrokerInterface 516D with the ":FaceValue", ":BondRate", ":CouponFrequency", ":RedemptionRate", ":Redemption-Value", and ":P1" data item values provided by BondProviderA 516A and the ":YieldRate" data item value provided by YieldCalc 516C as parameters, as well as the version identification for the transaction to which they belong. BrokerInterface 516D, in response, presents the bond details as well as the price provided by BondProviderA 516A and the yield rate calculated by YieldCalc 516C, together with details and yield rates for other bonds.

Figure 12:
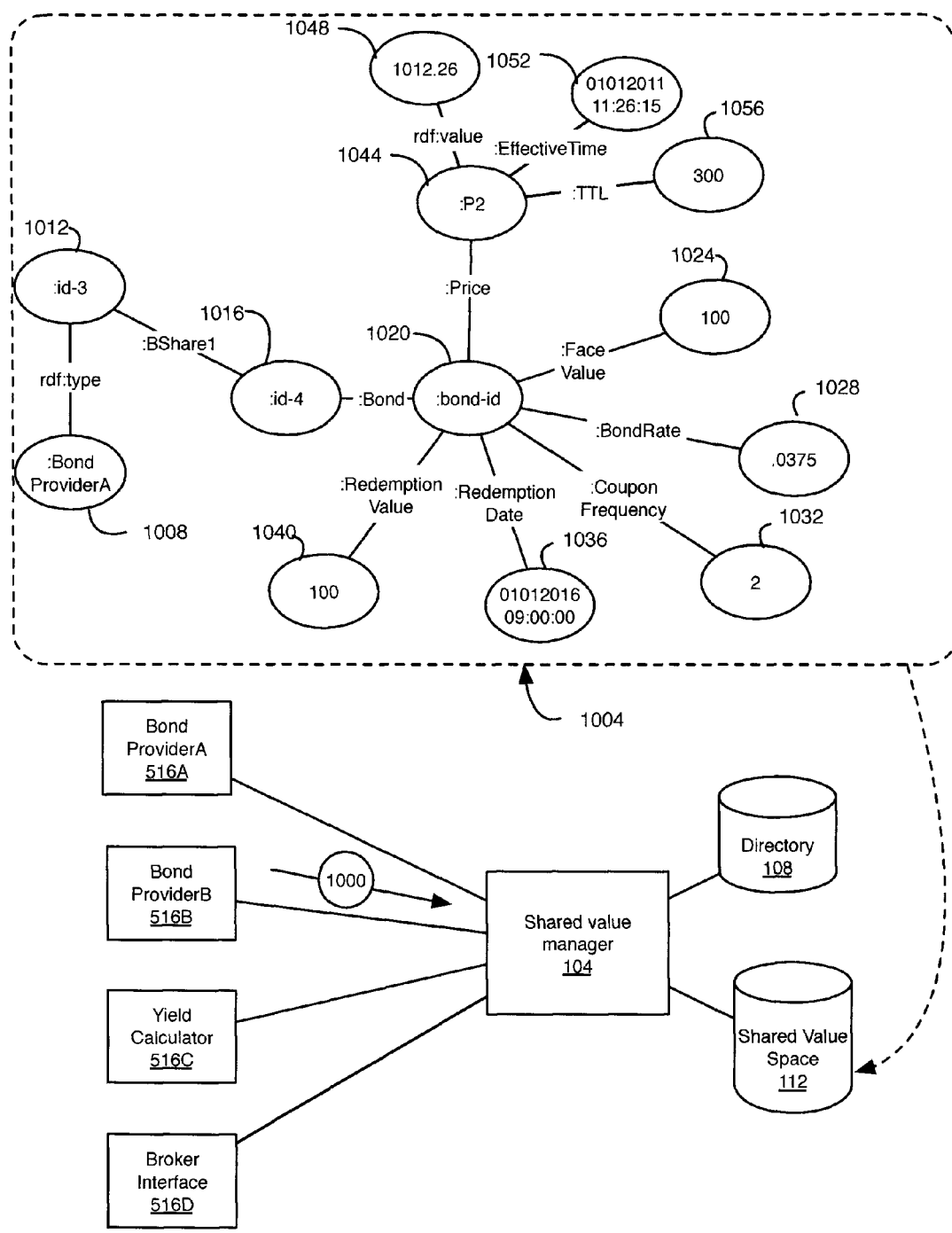
FIG. 12 shows data being shared by a second of the bond provider software systems of FIG. 7.

FIG. 12 shows BondProviderB 516B sending a communication 1000 to the shared value manager 104 that includes a set of parameters, and a set of data item values provided as a set of triples that form a graph data structure 1004. The parameters identify the instance of the software system type that BondProviderB 516B is and the type of share that BondProviderB 516B is providing. In particular, a software system type BondProviderB 1008 is shown having an instance id-1 1012. The particular instance id-1 1012 of the software system is providing a share id-2 1016. The share id-2 1016 includes a bond bond-id 1020. The set of triples sent by the particular instance id-1 1012 of BondProviderA 516A for bond-id 1020 are shown below, together with a description of what each triple states.

| Subject | Predicate | Object | Reference Number | Description |
|---|---|---|---|---|
| :bond-id | :FaceValue | 100 | 1024 | bond-id has a face value of "100" |
| :bond-id | :BondRate | .0375 | 1028 | bond-id has a bond rate of ".375" |
| :bond-id | :CouponFrequency | 2 | 1032 | bond-id has a coupon frequency of "2" |
| :bond-id | :RedemptionDate | 01012015 09:00:00 | 1036 | bond-id has a redemption date of "01012015 09:00:00" |
| :bond-id | :RedemptionValue | 100 | 1040 | bond-id has a redemption value of "1000" |
| :bond-id | :Price | :P2 | 1044 | bond-id has a price |
| :P2 | rdf:value | 1012.26 | 1048 | Price has a value of "1012.26" |
| :P2 | :EffectiveTime | 01012011 11:26:15 | 1052 | Price has an effective time of "01012011 11:26:21" |
| :P2 | :TTL | 300 | 1056 | Price has a TTL of "300" |

Note that ":bond-id" is a non-private unique identifier in this example that is generated by BondProviderB 516B for external use. The shared value manager 104 generates identifiers for the instance of the software system type and the share at registration time. For illustration purposes, these values are "id-3" and "id-4" respectively.

In addition, the graph data structure 804 that the shared value manager 104 generates in the shared value space 112 as a result of receiving the parameters and shared data item values from BondProviderB 516B is shown. As will be appreciated, BondProviderB 516B has shared a bond that is has a face value of 100, a bond rate of 3.75%, a coupon frequency of semi-annually, a redemption date of Jan. 1, 2015 at 9:00 am, a redemption value of 100, a price of 1012.26, an effective time of Jan. 1, 2011 11:26:15 and a TTL of 300 seconds.

Upon receiving the data item values, the shared value manager 104 executes the methods 300 and 400. As a result, the shared value manager 104 determines that the consume request submitted by YieldCalc 516C has been satisfied.

Figure 13:
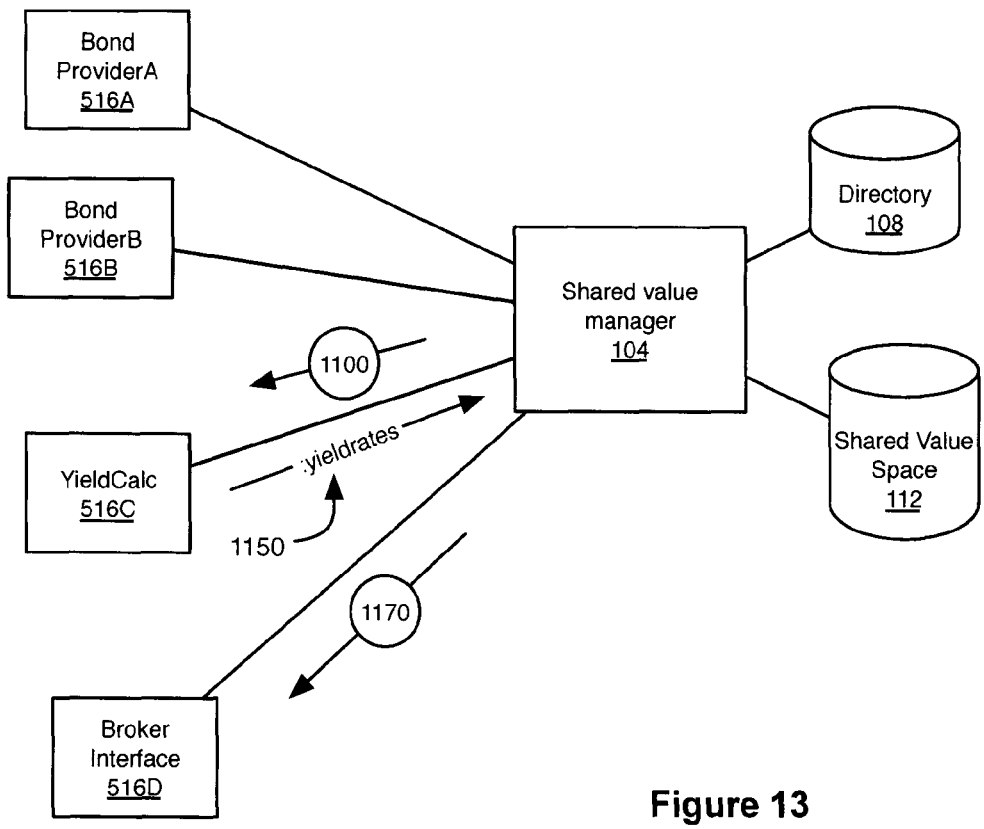
FIG. 13 shows a consume request of YieldCalc being fulfilled by the shared value manager, and YieldCalc, in response, sharing data that is then passed on to BrokerInterface.

FIG. 13 shows the shared value manager 104 fulfilling the consume request of YieldCalc 516C by making a call 1100 to the address identified in the consume request to YieldCalc 516C with the ":FaceValue", ":BondRate", ":CouponFrequency", ":RedemptionRate", ":RedemptionValue", and ":P2" data item values provided by BondProviderB 516B as parameters, as well as the version identification for the transaction to which they belong.

YieldCalc 516C is configured such that, upon receiving these values, it calculates an effective yield rate, which YieldCalc 516C has indicated it would share with the stateful data sharing service 100. YieldCalc 516C is shown sharing this in a communication 1150 with the shared value manager 104.

Once the shared value manager 104 notices that the consume request submitted by the BrokerInterface 516D has been satisfied, it fulfills the consume request by making a call 1170 to the address identified in the consume request of BrokerInterface 516D with the ":FaceValue", ":BondRate", ":CouponFrequency", ":RedemptionRate", ":RedemptionValue", and ":P2" data item values provided by BondProviderA 516A and the ":YieldRate" data item value provided by YieldCalc 516C as parameters, as well as the version identification for the transaction to which they belong. BrokerInterface 516D, in response, presents the bond details as well as the price provided by BondProviderB 516B and the yield rate calculated by YieldCalc 516C, together with details and yield rates for other bonds, such as those provided by BondProviderA 516A.

As noted above, the data item value 848 for "price" provided by BondProviderA 516A has an effective time 852 of Jan. 1, 2011 11:24:21 and a TTL of 300 seconds. Thus, this price expires at Jan. 1, 2011 11:29:21. During executing of method 480, the shared value manager 104 determines that, at that time, the price value provided by BondProviderA 516A has expired. As a result, the shared value manager 104 redacts this value in the shared value space 112. Upon this change to the value of price, the shared value manager 104 determines that the standing consume request of YieldCalc 516C is satisfied.

Figure 14:
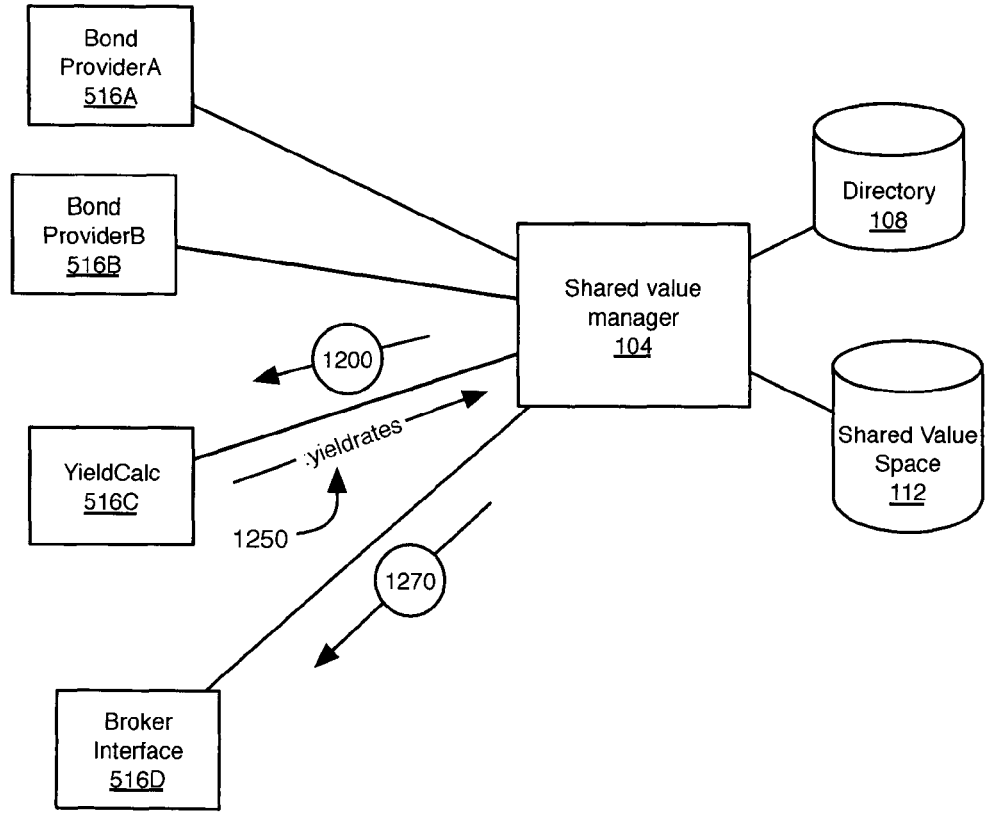
FIG. 14 shows the communication of the expiry of a consume request by the shared value manager to YieldCalc, which in turn removes its data items generated using the expired data.

FIG. 14 shows the shared value manager 104 sending a communication 1200 with the current set of bond information to YieldCalc 516C. In response, YieldCalc 516C shares a new set of yield rates. Upon receiving the updated yield rates, the shared value manager 104 sends a communication 1270 to the BrokerInterface 516D with the current set of bonds and yield rates. In response, BrokerInterface 516D updates its display to reflect the current set.

Figure 15:
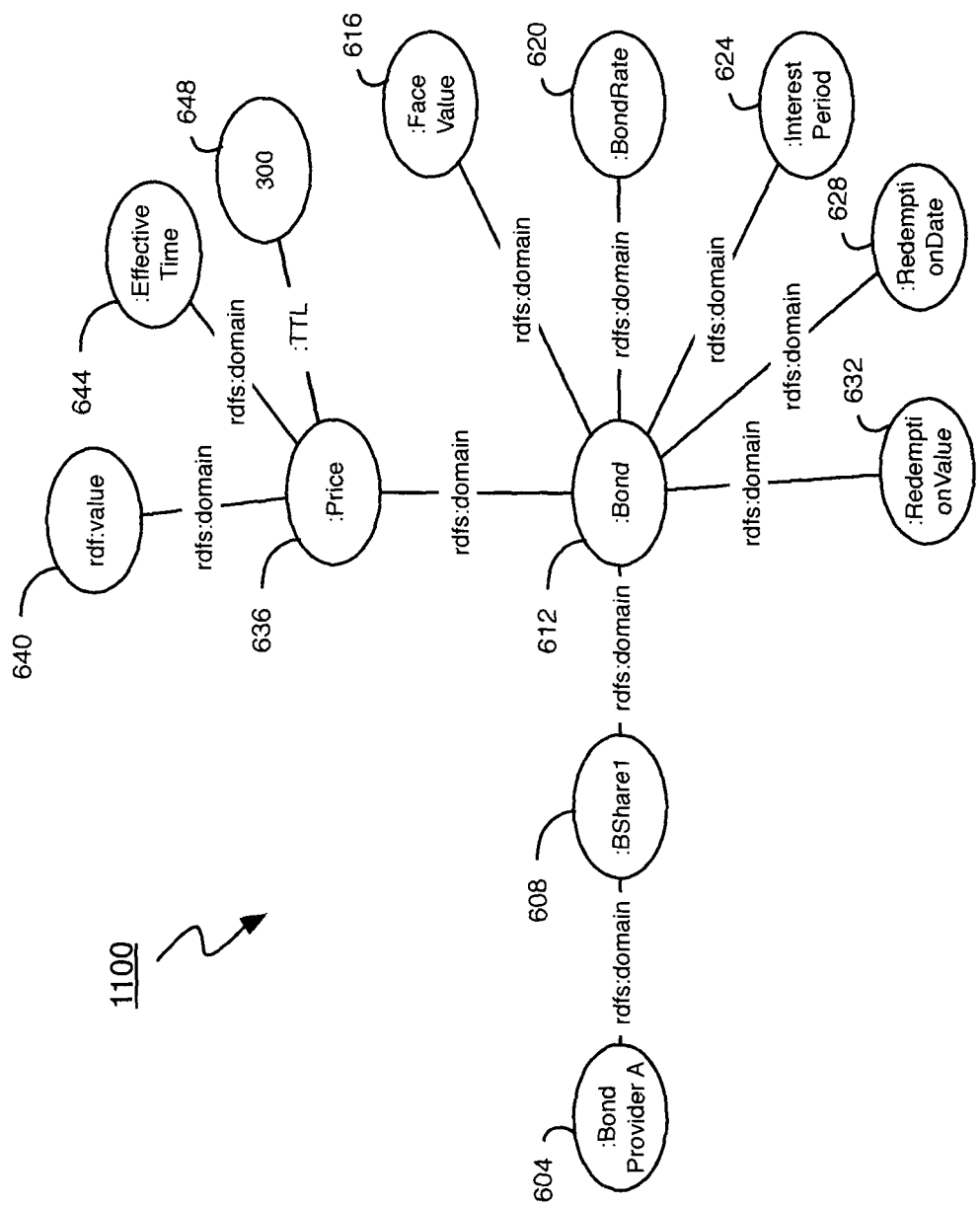
FIG. 15 illustrates a graph data structure definition for the data shared by the BondProviderA and BondProviderB software systems of FIG. 7 in accordance with an alternative embodiment of the invention.

FIG. 15 shows a variation of the example of FIGS. 8 to 14, wherein the TTL information is declared in the graph data structure definition. As can be seen, the graph data structure definition 1100 is very similar to the graph data structure definition 600 shown in FIG. 8, except that ":Price" 636 now has a property called ":TTL" with a value of "300". This signifies that data items of the type ":Price" have a lifetime of 300 seconds by default, unless lifetime information is included with the data items when provided to indicate otherwise.

By including lifetime information in the structure of the semantically-identified data, software systems need not poll other software systems to determine the validity of data. The lifetime information can be flexible to cover situations where the lifetime information is globally defined for all data of a particular data type, where the lifetime information is provided with the data items or a combination of both methods. In the described embodiments, as the stateful data sharing system registers and tracks lifetime information, it can drive transactions based on the supply and expiry of data items.

Computer-executable instructions for implementing the stateful data sharing service on a computer system could be provided separately from the computer system, for example, on a computer-readable medium (such as, for example, an optical disk, a hard disk, a USB drive or a media card) or by making them available for downloading over a communications network, such as the Internet. The computer-executable instructions could be bundled with one or more software systems. For example, visiting a website that includes software system functionality could trigger a download event for the computer-executable instructions.

While the invention has been described with specificity to a Java implementation, other types of implementations will occur to those of skill in the art. For example, the stateful data sharing service could be written in any one of a number of programming languages, such as Microsoft's C# or Javascript. Any general purpose programming language could be substituted.

The lifetime information can be included in the graph data structure definition as a default, and overridden where lifetime information is included with data items as they are provided.

The lifetime information can specify the expiry of data items in a variety of ways. For example, the lifetime information can specify that data items expire at a specified absolute time. In another embodiment, the TTL period commences with the receipt of the data by the stateful data sharing service. In a further embodiment, the lifetime of the data items expires a set time period after the software system that provided it becomes unresponsive. Still further, the lifetime information can specify the valid period of the data items by specifying when the data items are not valid.

The lifetime information can be combined with other information regarding the persistence of data to provide enriched data persistence solutions.

The web interface for receiving requests could be substituted with any of a variety of interfaces, thus replacing the HTTP used with any communication protocol, such as Java Remote Method Invocation, NET Windows Communication Framework, Message queue style communications or even simple function calls.

RDF can be replaced as the metadata format by other types of metadata languages such as, for example, DAML, and XML.

SPARQL is only one possible query language for use in constructing standing queries. Other examples include XsRQL and RQL.

While the computer system is shown as a single physical computer, it will be appreciated that the computer system can include two or more physical computers in communication with each other. Accordingly, while the embodiment shows the various components of the stateful data sharing service residing on the same physical computer, those skilled in the art will appreciate that the components can reside on separate physical computers. Further, any or all of the components of the stateful data sharing service can reside on a separate physical computer from the software systems.

The shared value manager can maintain separate transactions in the shared value space or can create separate shared value spaces for each type of transaction.

The software systems could be either visual or non-visual, examples of clients systems include: web pages, rich web applications, client software like Microsoft Excel, SOA endpoints, Databases, JavaScript scripts, etc.

The addresses provided with consume requests can alternatively be address pointers, TCP/IP sockets, message channels or any other means of communicating with the software systems.

While a value update queue is used in the above-described embodiment, other methods of processing sets of data item values could be used. For example, alternative methods include the use of an exclusive lock, parallel execution with exclusive data spaces or any other method that ensures a consistent end-state for the shared value space after update.

Any identifier that provides uniqueness within the referenceable address space would work in place of URIs. For example, an integer or a Globally Unique Identifier ("GUID") could be employed.

Data translator software systems can be employed with the invention. For example, if a first software system contributes a value to the shared information set that a second software system doesn't understand, a third software system could interpret the value to allow the second software system to process it. Further, if lifetime information from a first software system is in a format that is not understood by a second software system, the lifetime information can be translated to a format understood by the second software system by a third software system.

Although shared data item values corresponding to outdated transactions are discarded in the embodiment described above, the stateful data sharing service could store data item values corresponding to different transactions simultaneously.

The software systems could repeatedly attempt to register with the stateful data sharing service if it was not active at the first attempt. Alternatively, they could cause the stateful data sharing service to initialize if is not active.

Other types of data item identifiers will occur to those skilled in the art.

The shared value manager could be started on demand instead of at the start-up of the computer system. The above-described embodiments are intended to be examples of the present invention and alterations and modifications may be effected thereto, by those of skill in the art, without departing from the scope of the invention that is defined solely by the claims appended hereto.

What is claimed is:

1. A method performed by a computing device for managing the lifetime of semantically-identified data, the method comprising:
   maintaining, by said computing device, a graph data structure in storage of said computing device, said graph data structure being defined by a graph data structure definition and having set of data items and relationships therebetween that are semantically identified, said graph data structure containing a semantic description associated with each said data item, each data item having a value;
   storing, by said computing device, lifetime information in at least one of said graph data structure and said graph data structure definition, said lifetime information describing the period during which at least one of said data item values in said graph data structure is valid;
   receiving, by said computing device, a consume request from a software system to receive updated values of said set of data items, said consume request including semantic descriptions of said data items; and
   when said value of one of said data items specified in said consume request becomes invalid:
   semantically resolving, by said computing device, said semantic descriptions of said requested data items included in said consume request and said semantic descriptions of said data items in said graph data structure; and
   electronically notifying said software system, by said computing device.

2. The method of claim 1, wherein said lifetime information is stored in said graph data structure.

3. The method of claim 1, further comprising: receiving said lifetime information with said graph data structure definition.

4. The method of claim 3, wherein said lifetime information received with said definition specifies a time-to-live for a data item type.

5. The method of claim 4, further comprising:
   receiving said lifetime information with said data items shared by a software system.

6. The method of claim 5, wherein said lifetime information received with said data items overrides said lifetime information received with said definition.

7. The method of claim 1, further comprising:
   receiving said lifetime information with said data items when shared by a software system.

8. The method of claim 1, further comprising:
   monitoring said lifetime information for said data items; and
   updating shared values when said lifetime information indicates that said data items have expired.

9. The method of claim 8, further comprising:
   notifying a software system of changes to data item values as a result of said data items having expired.

10. The method of claim 1, further comprising: receiving a data item of said data item type; and enforcing said lifetime information for said data item.

11. The method of claim 10, further comprising:
    storing said lifetime information and said data item in a graph data structure in said storage.

12. The method of claim 11, further comprising:
    receiving a data item of one of said at least one of said data item types; receiving lifetime information with said data item; and
    expiring said data items according to said lifetime information received with said data item.

13. The method of claim 1, wherein electronically notifying the software system comprises electronically communicating to the software system, by said computing device, said values of said set of data items that remain valid.

14. A system for managing the lifetime of semantically-identified data, comprising:
    a computer system having a storage;
    a graph data structure stored in said storage of said computing device, said graph data structure being defined by a graph data structure definition and having data items and relationships therebetween that are semantically identified, said graph data structure containing a semantic description associated with each said data item, each data item having a value;
    lifetime information stored in at least one of said graph data structure and said graph data structure definition, said lifetime information describing the period during which at least one of said data items in said graph data structure is valid; and
    a program executing on said computer system, the program being configured to cause the computer system to:
    receive consume requests from software systems to receive updated values of one or more of said data items, each consume request including semantic descriptions of said data items; and when said value of one of said data items specified in one of said consume requests becomes invalid:

semantically resolve said semantic descriptions of said requested data items included in said consume request and said semantic descriptions of said data items in said graph data structure; and electronically notify said software system that made said consume request.

15. The system of claim 14, wherein said lifetime information is stored in said graph data structure.

16. The system of claim 14, wherein said lifetime information is stored in said graph data structure definition.

17. The system of claim 16, wherein said lifetime information in said graph data structure definition defines the time-to-live for at least one of said data item types defined in said graph data structure.

18. A method performed by a computing device for managing the lifetime of semantically-identified data, comprising:

maintaining, by said computing device, a graph data structure in storage of said computing device, said graph data structure being defined by a graph data structure definition and having data items and relationships therebetween that are semantically identified, said graph data structure containing a semantic description associated with each said data item;

storing, by said computing device, lifetime information in at least one of said graph data structure and said graph data structure definition, said lifetime information describing the period during which at least one of said data items in said graph data structure is valid;

receiving, by said computing device, consume requests from software systems to receive updated values of said data items, each consume request including semantic descriptions of said data items;

when said value of one of said data items specified in one of said consume requests becomes invalid:

semantically resolving, by said computing device, said semantic descriptions of said requested data items included in said consume request and said semantic descriptions of said data items in said graph data structure; and electronically notifying the software system that made said consume request.

19. The method of claim 18, wherein said lifetime information is stored in said graph data structure.

20. The method of claim 18, further comprising: receiving said lifetime information with said graph data structure definition.

* * * * *